(12) United States Patent
Boday et al.

(10) Patent No.: US 10,344,115 B2
(45) Date of Patent: Jul. 9, 2019

(54) AMINE GLYOXAL RESINS

(71) Applicant: International Business Machines Corporation, Armonk, NY (US)

(72) Inventors: Dylan J. Boday, Tuscon, AZ (US); Mareva B. Fevre, San Jose, CA (US); James L. Hedrick, Pleasanton, CA (US); Gavin O. Jones, San Jose, CA (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 15/604,755

(22) Filed: May 25, 2017

(65) Prior Publication Data

US 2018/0340037 A1    Nov. 29, 2018

(51) Int. Cl.
    *C08G 12/08*    (2006.01)
    *C08J 5/18*     (2006.01)
    *C09D 161/22*   (2006.01)
    *C08G 12/00*    (2006.01)

(52) U.S. Cl.
    CPC ............. *C08G 12/08* (2013.01); *C08J 5/18* (2013.01); *C09D 161/22* (2013.01); *C08J 2361/22* (2013.01)

(58) Field of Classification Search
    CPC .................................................... C08G 12/08
    USPC .................................................... 528/24, 245
    See application file for complete search history.

(56) References Cited

U.S. PATENT DOCUMENTS

| 3,896,081 A | 7/1975 | Baxter et al. |
| 4,312,999 A | 1/1982 | Shields |
| 5,026,800 A | 5/1991 | Kimura et al. |
| 5,112,932 A | 5/1992 | Koenig et al. |
| 5,131,951 A | 7/1992 | Yoshida et al. |
| 6,132,930 A | 10/2000 | Hayashi et al. |
| 9,243,107 B2 | 1/2016 | Hedrick et al. |

(Continued)

FOREIGN PATENT DOCUMENTS

| CA | 2353680 A1 | 8/2000 |
| CN | 102977827 A | 3/2013 |

OTHER PUBLICATIONS

Chaloner-Gill et al., "13Cand 15NSolid-state NMR of Partially Methyl Substituted Polyazines", Macromolecules, 1991, 24, pp. 3074-3080.

(Continued)

*Primary Examiner* — Duc Truong
(74) *Attorney, Agent, or Firm* — Michael R. Roberts

(57) ABSTRACT

Condensation polymers are prepared by agitating a mixture comprising glyoxal, a monomer comprising two or three primary aromatic amine groups, an organic solvent, and water at a temperature between 20° C. and 100° C. The resulting solution can be applied to a surface of a substrate, forming an initial film. Curing the initial film layer using two or more heating steps, wherein one of the heat steps is performed at a temperature of 150° C. to 250° C., produces a cured film layer. Depending on the relative amounts of glyoxal and monomer used, the film layer can contain predominantly high Tg imine-containing units or predominantly lower Tg aminal-containing units. All film layers were highly resistant to the solvent used to prepare the polymer. The Tg of the polymer can be about 190° C. to greater than 300° C.

22 Claims, 13 Drawing Sheets

(56) References Cited

U.S. PATENT DOCUMENTS 9,303,139 B2     4/2016   Funabashi et al.

OTHER PUBLICATIONS

Chaloner-Gill et al., "Structure of Glyoxal Dihydrazone and Synthesis, Characterization, and Iodine Doping of Unsubstituted Polyazine", Macromolecules, 1990, 23, pp. 4597-4603.

Ferruti et al., "Synthesis and Nuclear Magnetic Resonance Characterization of I,I ,2,2-Tetra-aminoethanes, 1,I,2=Triaminoethenes, and 1,2-Dialkoxy-I,2-diaminoethanes", J. Chem. Soc.(C), 1968, pp. 2721-2725.

Ilyasov et al., "A novel approach for the synthesis of hexaazaisowurtzitane derivatives", Tetrahedron Letters (2013), vol. 54, pp. 1931-1932.

Kakanejadifard et al., "Synthesis and X-Ray Structural Determination of New Aniline Derivatives of 2,4,6,8-Tetraazabicyclo [3.3.0] octanes; Anomeric Effect in N—C—N Moiety and Implications of Solvent Polarity on 1H-NMR Patterns.", Tetrahedron, 1997, vol. 53, No. 7, pp. 2551-2556.

Kliegman et al., "Glyoxal Derivatives. 11, Reaction of Glyoxal with Aromatic Primary Amines", J . Org. Chem., 1970, vol. 35, No. 9, pp. 3140-3143.

Kua et al., "Thermodynamics and Kinetics of Imidazole Formation from Glyoxal, Methylamine, and Formaldehyde: A Computational Study", J. Phys. Chem. A, 2011, 115, 1667-1675.

Li et al., "Synthesis, characterization and electrical properties of soluble conjugated polySchiff bases", Synthetic Metals, 60 (1993) 285-288.

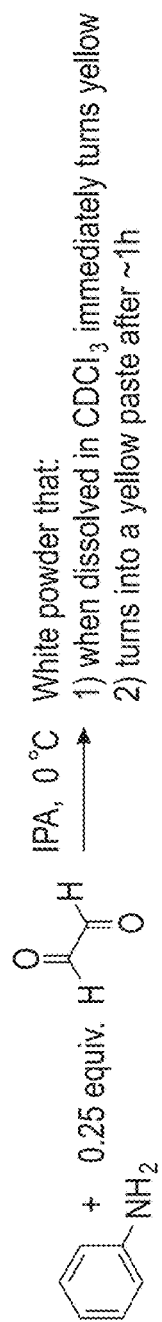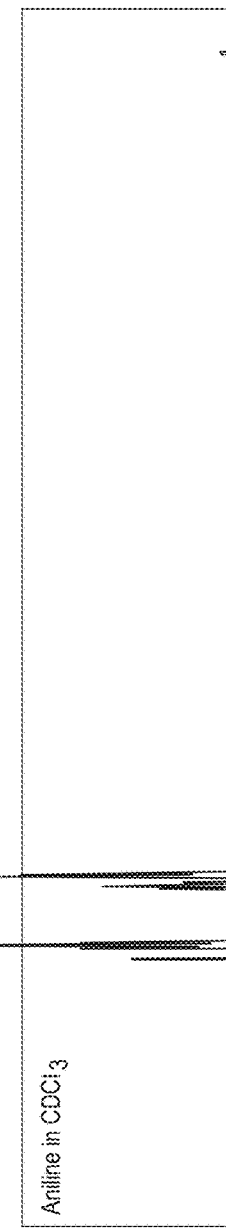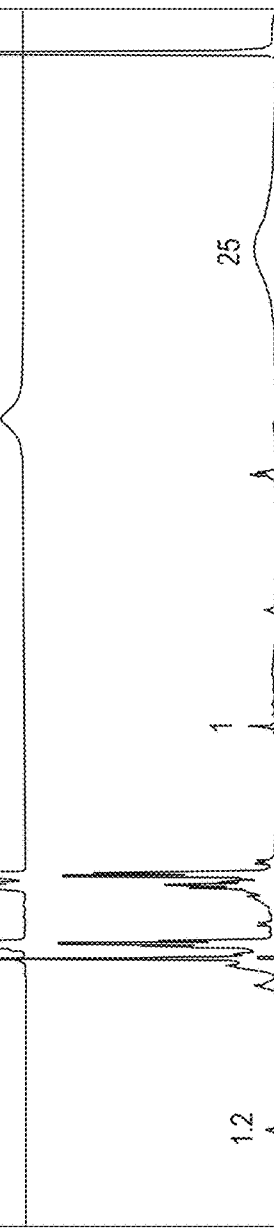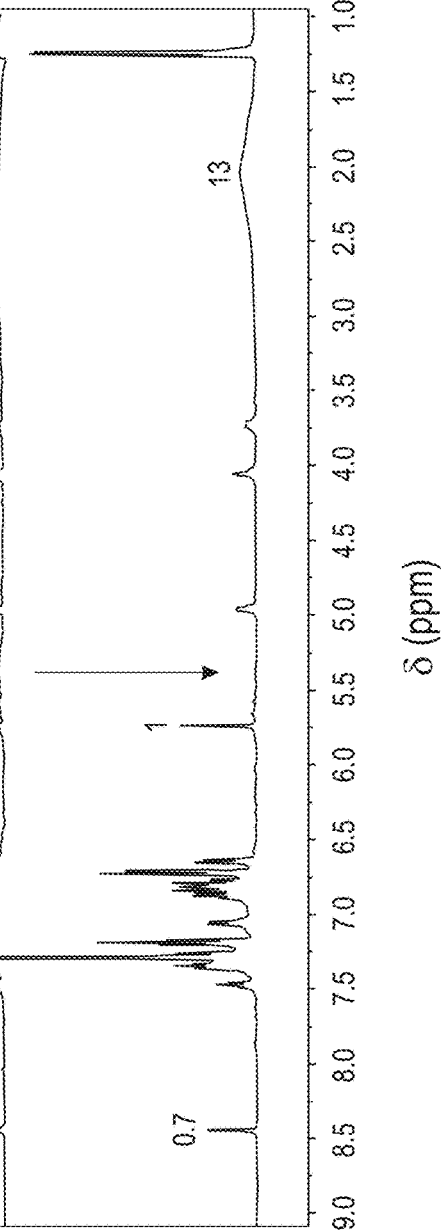
FIG. 5A
FIG. 5B
FIG. 5C

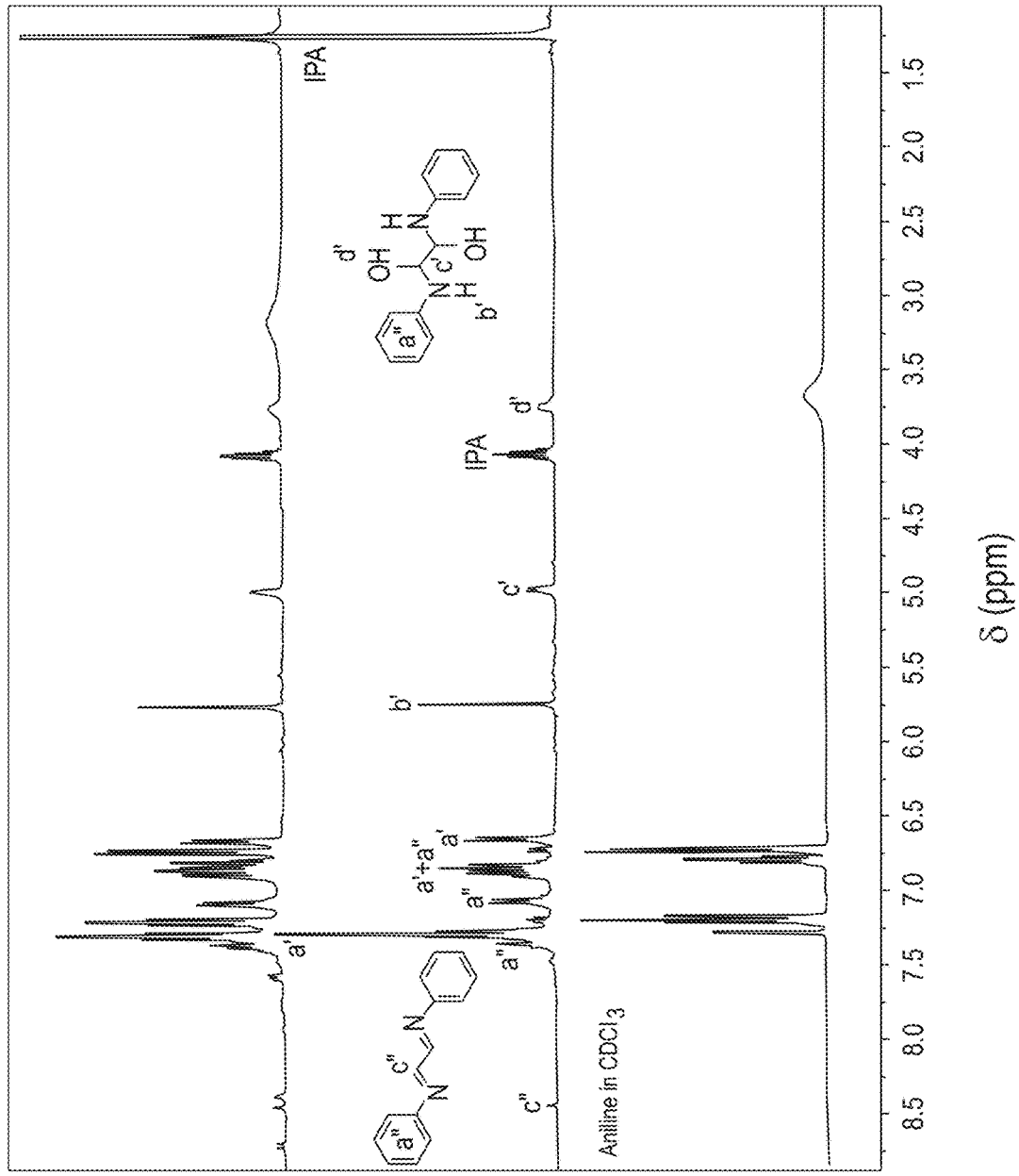

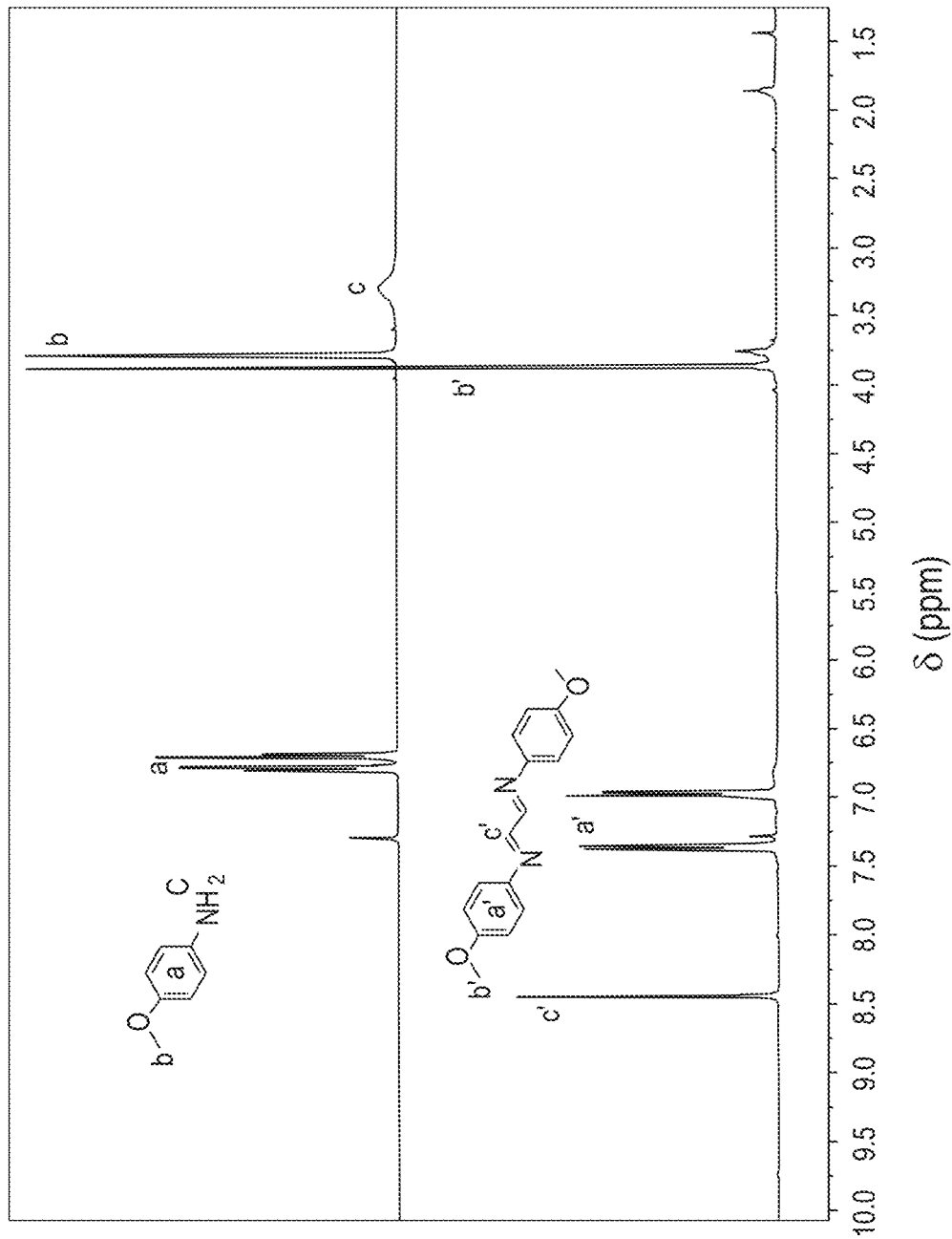

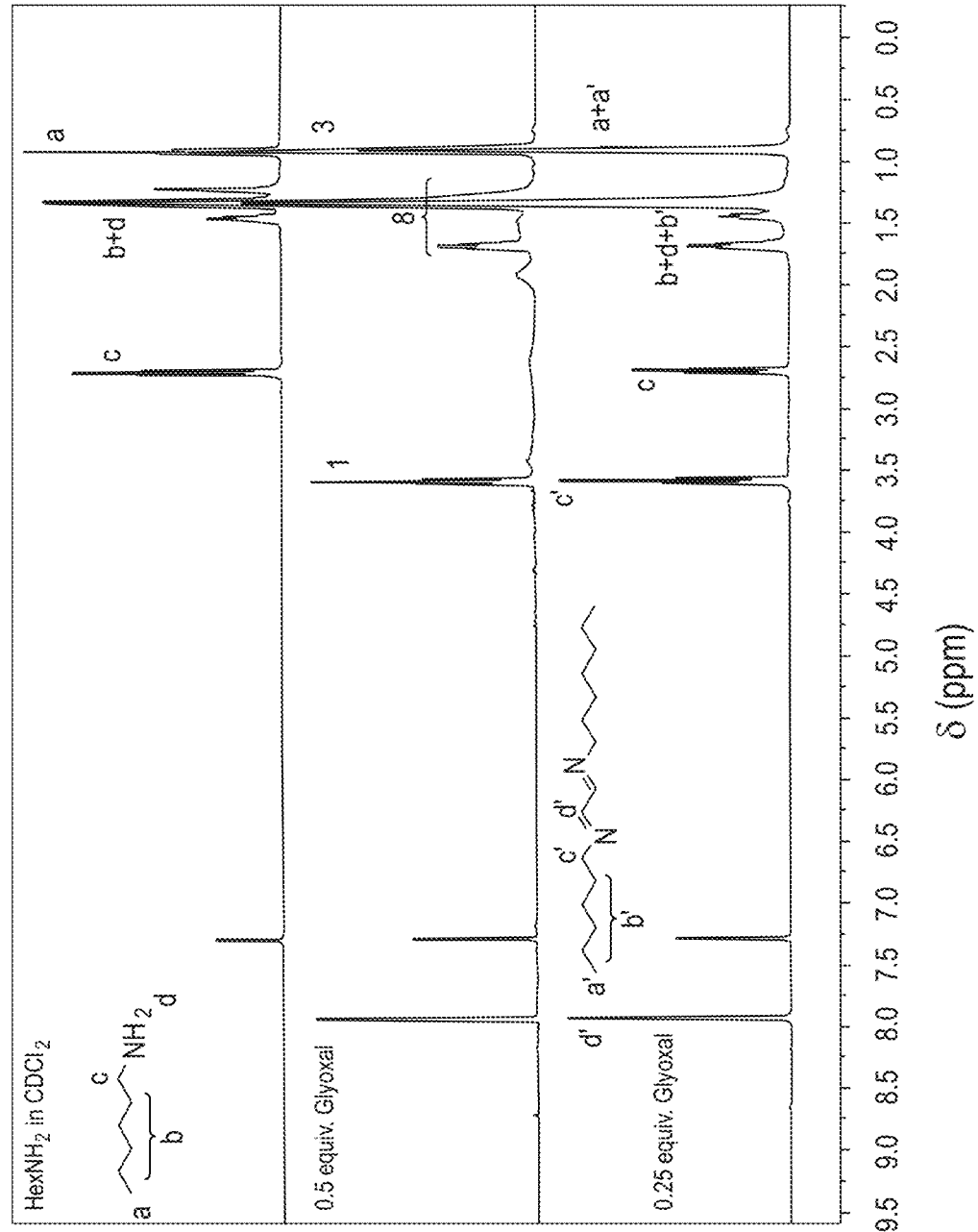

AMINE GLYOXAL RESINS

BACKGROUND

The present invention relates to amine glyoxal resins, and more specifically to methods of preparing amine glyoxal resins from aromatic diamines and glyoxal, and films therefrom.

U.S. Pat. No. 9,243,107 describes the synthesis of poly (1,3,5-hexahydro-1,3,5-triazine)s (PHTs) by condensation polymerization of aromatic diamines with paraformaldehyde (PF). PHTs possess a number of attractive characteristics: high Young's modulus, solvent and environmental stress crack resistance, design flexibility, and recyclability.

Typically, solid 4,4'-oxydianiline (ODA) and solid PF (1.25 molar equivalents relative to ODA based on formaldehyde molecular mass, are mixed in N-methylpyrrolidone (NMP) at 50° C. in a closed vessel. After about 15-20 minutes, the solution becomes clear, suggesting complete solubilization of ODA and cracking of PF. The solution also has a low viscosity comparable to the NMP solvent. Prolonged reaction times (about 1 hour for a 16 wt % solid composition) at 50° C. lead to a sudden (within tens of seconds) and large increase in viscosity, eventually resulting in gelation of the solution. At this stage, the gel network is referred to as a hemiaminal dynamic covalent network (HDCN), shown in Scheme 1.

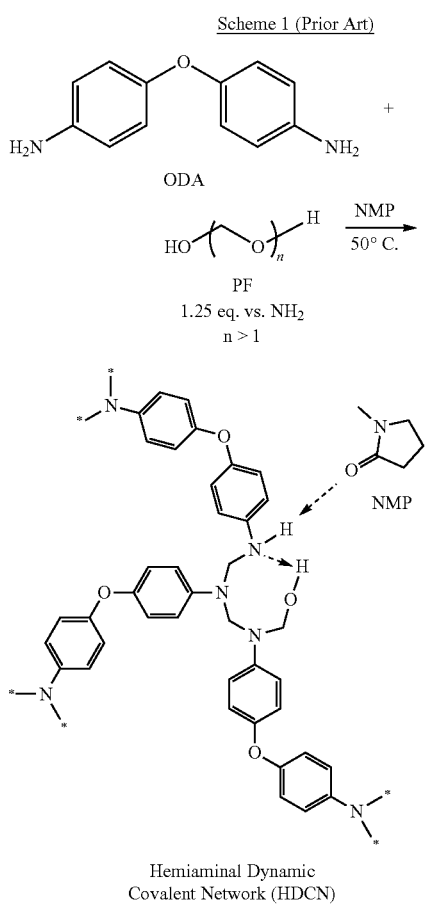

Scheme 1 (Prior Art)

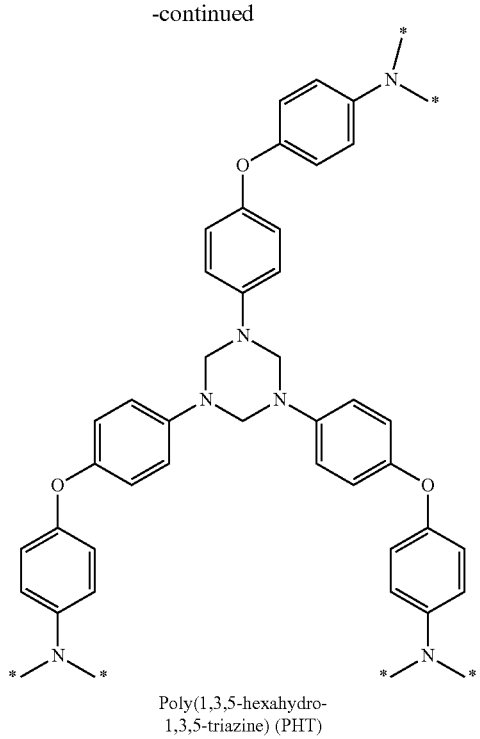

Poly(1,3,5-hexahydro-1,3,5-triazine) (PHT)

Before the gelation stage is reached, the low viscosity solution can be cast into films. Subsequent curing of the film at about 200° C. results in the transformation of the network into a PHT (Scheme 1). Although this method allows for the preparation of defect-free films on a small scale, the processing time-window and low viscosity of the solution limit the range of applications (e.g., composites, coatings) of these materials. Moreover, ODA-based PHTs exhibit limited stability at temperatures above 200° C. Therefore, complete removal of the bound NMP solvent is difficult and impacts the reproducibility of film properties (e.g., thermal properties). Also, even though formaldehyde is widely used for maleimide, urea-formaldehyde and phenol-formaldehyde resins, it is highly toxic and classified as a human carcinogen. Therefore, the potential for exposure to formaldehyde during synthesis of the PHT resin and the possibility of formaldehyde leaching from the resin after film preparation are major drawbacks of PHT materials.

A need exists for a solvent-resistant resin having good thermo-mechanical and recyclability properties similar to PHTs that has a low toxicity risk during and after synthesis, as well as greater batch-to-batch reproducibility.

SUMMARY

Accordingly, a polymer is disclosed, comprising:

i) a nitrogen-containing unit selected from the group consisting of:

divalent bis-imine units of structure (A):

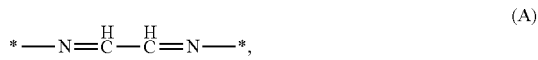

(A)

trivalent imine-aminal units of structure (B):

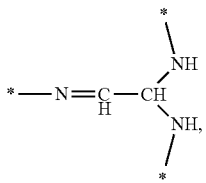

tetravalent bis-aminal units of structure (C):

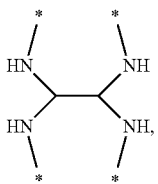

and
combinations thereof;

ii) divalent and/or trivalent bridging groups of formula (1):

wherein y' is 2 or 3, and K' is a radical comprising at least one 6-carbon aromatic ring; and iii) polymer chain-terminating monovalent end groups; wherein each nitrogen of a given one of the nitrogen-containing units is covalently linked to an aromatic carbon of a different one of the bridging groups, and the end groups are covalently linked to respective bridging groups.

Also disclosed is a method of forming the above-described polymer, comprising:

agitating a reaction mixture comprising i) a monomer selected from the group consisting of diamine monomers comprising two primary aromatic amine groups, triamine monomers comprising three primary aromatic amine groups, and combinations thereof, ii) an optional diluent monomer comprising one aromatic primary amine group, iii) glyoxal, iv) a water-miscible organic solvent, and v) water, thereby forming a solution comprising an initial polymer; and heating the solution using one or more independent heating steps that includes a last heating step, wherein the last heating step is performed at a temperature of 150° C. to 250° C., thereby producing the polymer.

Further disclosed is a film layer comprising an above-described polymer.

Also disclosed is a method of forming the above-described film layer, comprising:

agitating a reaction mixture comprising i) a monomer selected from the group consisting of diamine monomers comprising two primary aromatic amine groups, triamine monomers comprising three primary aromatic amine groups, and combinations thereof, ii) an optional diluent monomer comprising one aromatic primary amine group, iii) glyoxal, iv) a water-miscible organic solvent, and v) water, thereby forming a solution comprising an initial polymer;

applying the solution to a surface of a substrate, thereby forming an initial film layer disposed on the surface; and curing the initial film layer using one or more sequential heating steps that includes a last heating step, wherein the last heating step is performed at a temperature of 150° C. to 250° C., thereby forming the film layer.

Also disclosed is a polymer comprising a plurality of units selected from the group consisting of divalent bis-imine units, trivalent imine-aminal units, tetravalent bis-aminal units, and combinations thereof, wherein the units are covalently linked to divalent or trivalent bridging groups; wherein the bridging groups comprise at least one 6-carbon aromatic ring, aminal groups of the imine-aminal units and bis-aminal units comprise respective secondary nitrogens, and nitrogens of the bis-imine units, imine-aminal units, and bis-aminal units are linked to respective aromatic carbons of the bridging groups.

The above-described and other features and advantages of the present invention will be appreciated and understood by those skilled in the art from the following detailed description, drawings, and appended claims.

BRIEF DESCRIPTION OF THE SEVERAL VIEWS OF THE DRAWINGS

FIG. 5A is a $^1$H NMR spectrum of aniline used in the reaction of Scheme 2 (i).

FIG. 5B is a $^1$H NMR spectrum of the fresh solution of white powder in CDCl$_3$ formed by the reaction of Scheme 2 (i).

FIG. 5C is a $^1$H NMR spectrum of the solution of white powder formed by the reaction of Scheme 2 (i) in CDCl$_3$ after 1 hour.

FIG. 6A is a $^1$H NMR spectrum of the crude reaction mixture formed by the reaction of Scheme 2 (ii).

FIG. 6B is a $^1$H NMR spectrum of the mixture of isolated bis-aminal and bis-imine products formed by the reaction of Scheme 2 (ii).

FIG. 6C is a $^1$H NMR spectrum of aniline used in the reaction of Scheme 2 (ii).

FIG. 7A is a $^1$H NMR spectrum of p-methoxyaniline used in the reactions of Scheme 2 (iii) and (iv).

FIG. 7B is a $^1$H NMR spectrum of the bis-imine product formed with 0.25 mole equivalents glyoxal formed by the reaction of Scheme 2 (iii).

FIG. 9A is a $^1$H NMR spectrum of n-hexylamine used in the reactions of Scheme 2 (vi) and (vii).

FIG. 9B is a $^1$H NMR spectrum of the crude bis-imine product formed with 0.50 mole equivalents glyoxal formed by the reaction of Scheme 2 (vi).

FIG. 9C is a $^1$H NMR spectrum of the crude bis-imine product formed with 0.25 mole equivalents glyoxal formed by the reaction of Scheme 2 (vii).

DETAILED DESCRIPTION

Figure 1:
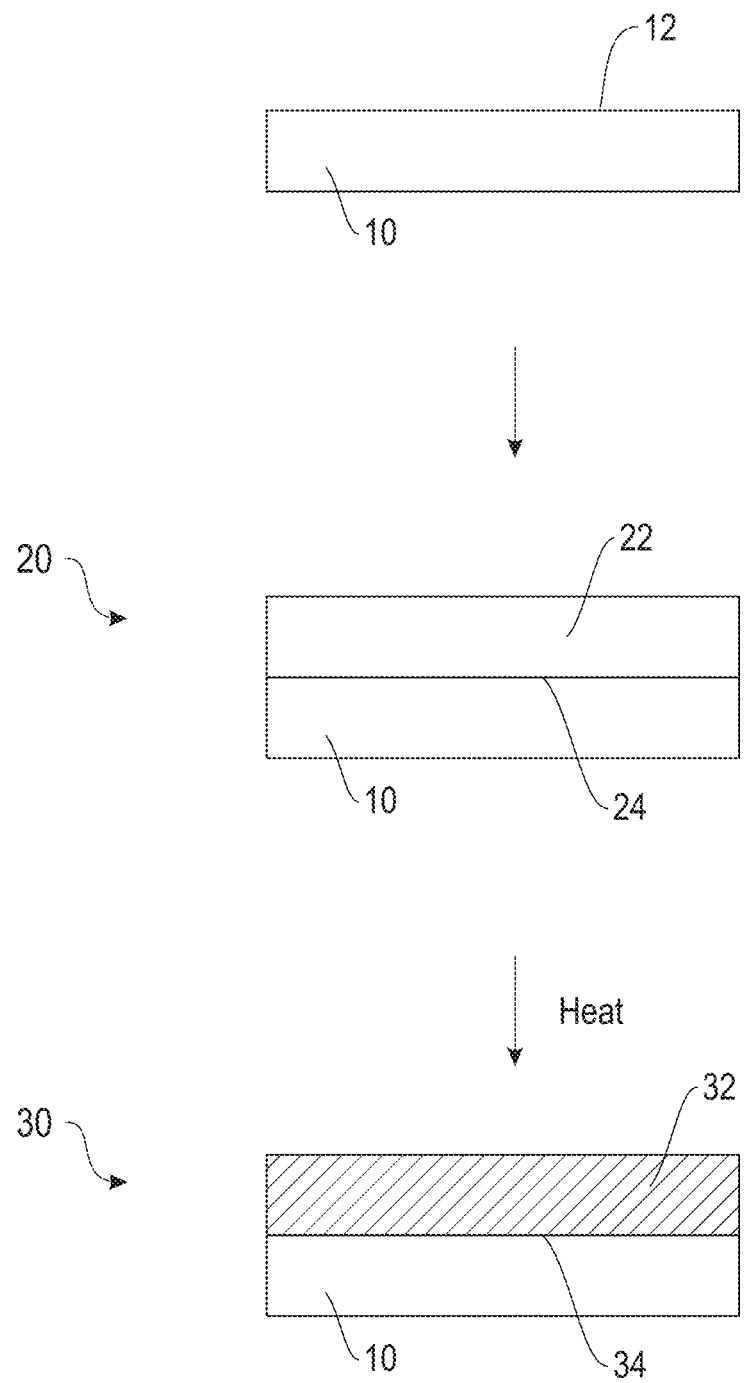
FIG. 1 is a series of cross-sectional layer diagrams illustrating formation of a film layer comprising the cured polymer.

Solvent-resistant polymers are disclosed that comprise a plurality of subunits selected from the group consisting of divalent bis-imine units, trivalent imine-aminal units, tetravalent bis-aminal units, and combinations thereof, which are covalently linked to divalent or trivalent bridging groups comprising at least one 6-carbon aromatic ring. Also disclosed are methods of preparing the solvent-resistant polymers, and films thereof, by condensation polymerization of a primary aromatic diamine with a dialdehyde, more specifically glyoxal, in a water-miscible organic solvent and water.

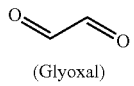

(Glyoxal)

The following description focuses on glyoxal but is applicable to other dialdehydes. The dialdehydes can be used singularly or in combination.

An initial polymer formed by the condensation polymerization is cured in one or more heating steps that includes a last heating step at a temperature of about 150° C. to 250° C. for a period of about 30 minutes to about 24 hours, thereby forming a disclosed polymer. Herein, the terms "disclosed polymer" and "polymer" mean the cured polymer. The curing process removes organic solvent and water and promotes conversion of intermediate hemi-aminal groups of the condensation reaction to imine groups and/or aminal groups. The cured polymer can be branched or unbranched, crosslinked or non-crosslinked. The cured polymer can be substantially insoluble in the organic solvent used to prepare the cured polymer. The cured polymer can have a Tg greater than 190° C., greater than 220° C., greater than 278° C., or greater than 300° C., as measured by differential scanning calorimetry (DSC).

The cured polymer prepared from glyoxal comprises nitrogen-containing units that are residues of glyoxal (also referred to herein as "glyoxal residues"). The glyoxal residues are members selected from the group consisting of:

a) divalent bis-imine units of structure (A):

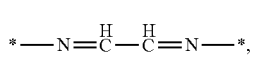

(A)

b) trivalent imine-aminal units of structure (B):

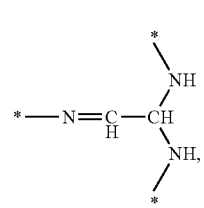

(B)

c) tetravalent bis-aminal units of structure (C):

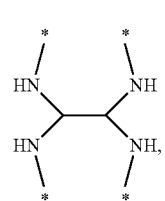

(C)

and d) combinations thereof.

The aminal groups of (B) and (C) comprise secondary nitrogens (i.e., non-charged nitrogens covalently linked to two carbons and one hydrogen). The cured polymer can comprise other nitrogen-containing units comprising one or more oxygens, referred to herein as optional glyoxal residues. The optional glyoxal residues have a valency of 1 to 3. Non-limiting examples of optional glyoxal residues include the following.

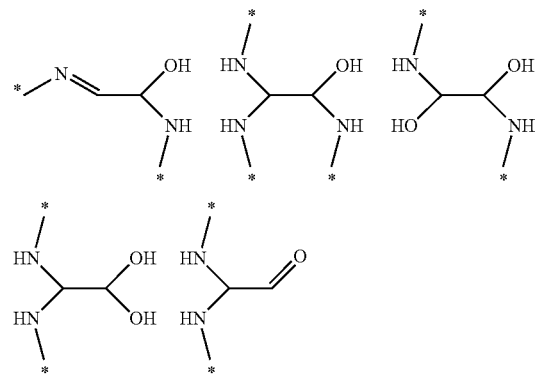

The cured polymer can comprise the optional glyoxal residues singularly or in combination.

The glyoxal residues and optional glyoxal residues, when present, are covalently linked to divalent or trivalent bridging groups of formula (1):

(1), wherein y' is 2 or 3, and K' is a divalent or trivalent radical comprising at least one 6-carbon aromatic ring. Each bond to an asterisk of formula (1) emanates from an aromatic carbon. The bridging groups can be used singularly or in combination. The nitrogens of the bis-imine units, imine-aminal units, and bis-aminal units are preferably linked to respective aromatic carbons of the bridging groups, as illustrated further below.

Herein, an atomic center shown linked to an asterisk means the atomic center is linked to another unspecified atomic center of the polymer represented by the asterisk. For example, the nitrogens of a given glyoxal residue or a given optional glyoxal residue are covalently linked to respective aromatic carbons of different bridging groups. Additionally, each aromatic carbon linked to an asterisk of a given bridging group K' can be covalently linked to a nitrogen of a glyoxal residue, optional glyoxal residue, or a polymer chain-terminating end group. End groups are discussed further below.

Non-limiting examples of trivalent bridging groups (y'=3) include the following groups.

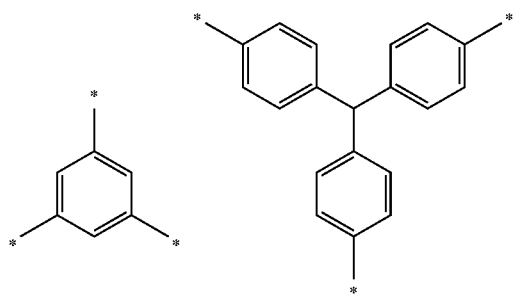

Formulas (2), (3), and (4) below are possible sub-structures of the cured polymer when K' has a valency of 3 and is linked to (A), (B), and (C), respectively. The cured polymer can comprise one or more of these sub-structures.

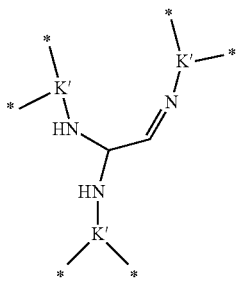
(2)

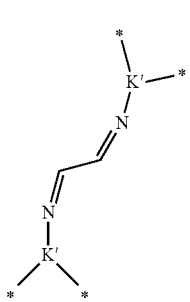
(3)

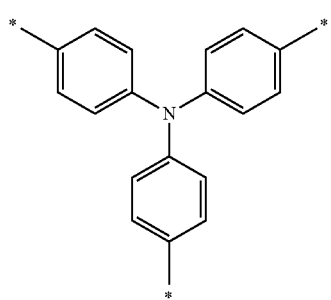
(4)

Each asterisk linked to K' in the above sub-structures can be a respective nitrogen of a glyoxal residue, optional glyoxal residue, or an atomic center of an end group.

Formulas (5), (6), and (7) below are possible sub-structures of the cured polymer when K' has a valency of 2 and is linked (A), (B), and (C). The cured polymer can comprise one or more of these sub-structures.

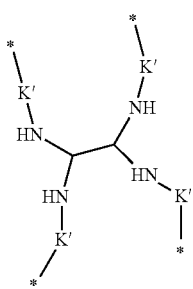
(5)

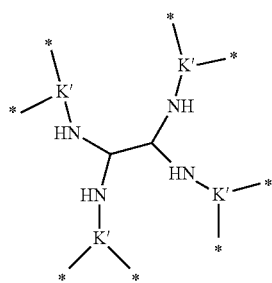
(6)

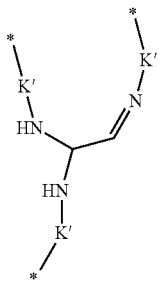

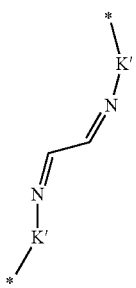

(7)

More specific divalent bridging groups have a structure according to formula (8):

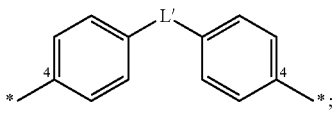

(8)

wherein each carbon para to L' is labeled 4, and

L' is a divalent group selected from the group consisting of *—O—*, *—S—*, *—N(R')—*, *—N(H)—*, *—R"—*, wherein R' and *—R"—* are independent hydrocarbyl groups comprising at least 1 carbon. R' is monovalent, whereas *—R"—* is divalent.

Exemplary non-limiting R' groups include methyl, ethyl, propyl, isopropyl, and phenyl.

Exemplary non-limiting *—R"—* groups include methylene (*—CH$_2$—*), ethan-1,2-diyl (*—CH$_2$CH$_2$—*), ethen-1,2-diyl (*—CH=CH—*), isopropylidenyl (*—C(Me)$_2$-*), and fluorenylidenyl:

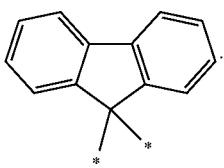

Even more specific divalent bridging groups include the following groups.

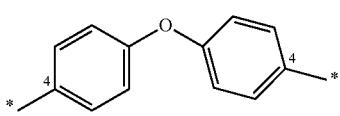

(D)

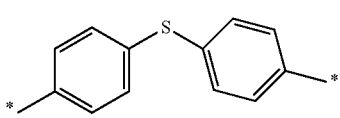

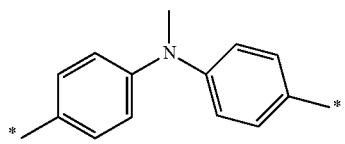

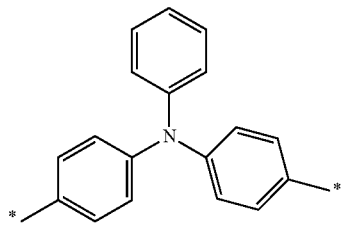

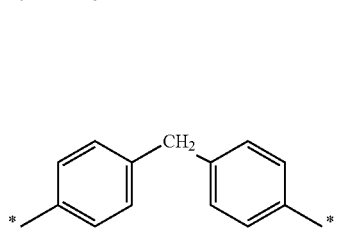

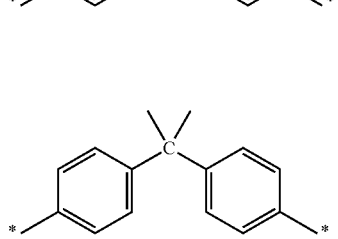

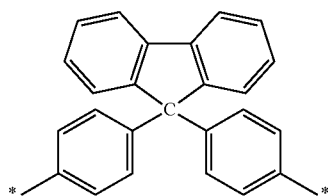

The divalent bridging groups can be used singularly or in combination.

The following examples illustrate sub-structures of the cured polymer in which bridging group (D) (a bridging group of formula (8) wherein L' is *—O—*) is bound to glyoxal residues (A), (B), and (C). Each nitrogen of a given bis-imine unit (A), when present, is covalently linked to a carbon para to L' of a different one of the bridging units, as shown below in sub-structure (I). Each nitrogen of a given imine-aminal unit (B), when present, is covalently linked to a carbon para to L' of a different one of the bridging units, as shown below in sub-structure (II). Each nitrogen of a given bis-aminal unit (C), when present, is covalently linked to a carbon para to L' of a different one of the bridging units, as shown below in sub-structure (III).

(I)

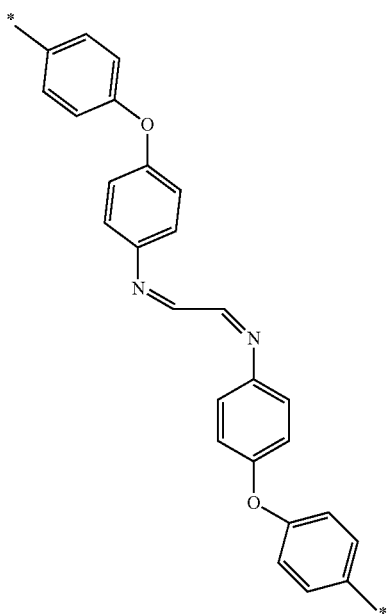

(III)

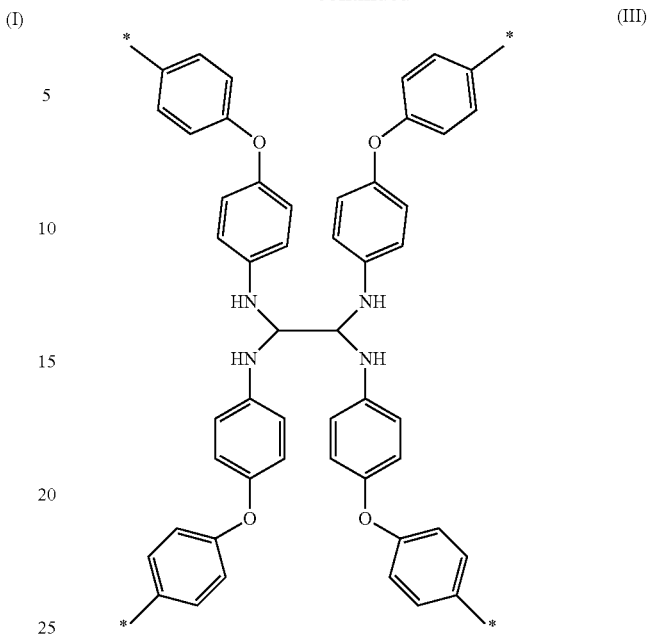

The cured polymer can comprise one or more of sub-structures (I), (II), and (III). The initial polymer can comprise one or more of sub-structures (I), (II), and (III).

The cured polymer comprises polymer chain-terminating monovalent end groups. Non-limiting examples of end groups include the following groups.

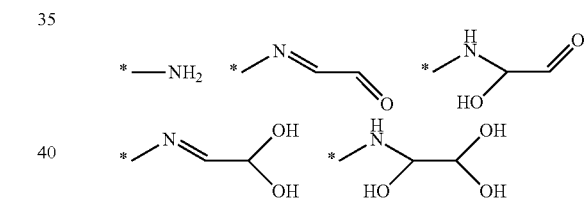

(II)

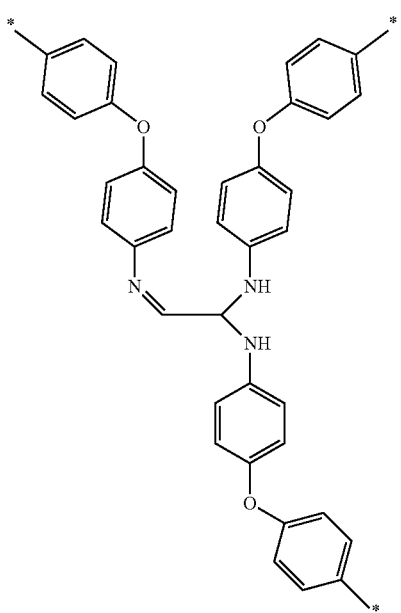

Examples of end groups linked to one of the carbons para to L' of bridging group (D) are shown below.

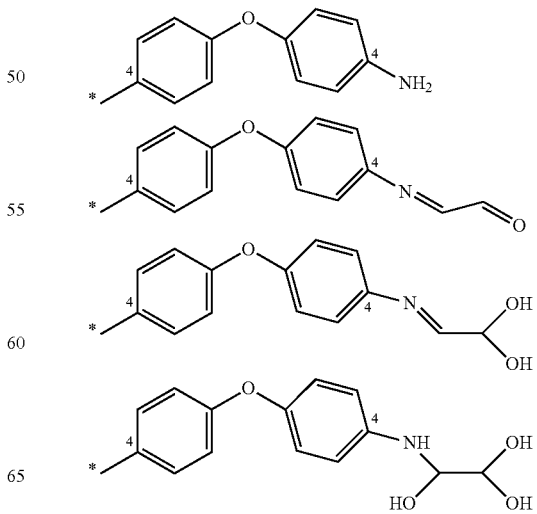

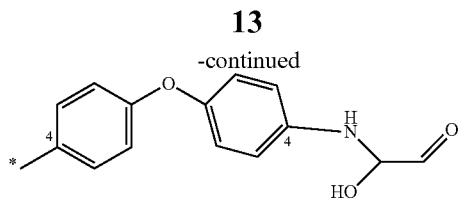

The cured polymer can further comprise monovalent aromatic groups (referred to herein as diluent groups), which do not participate in chemical crosslinking and therefore can serve to control the crosslink density as well as the physical and mechanical properties of the cured polymers. Monovalent diluent groups have a structure according to formula (9), (10), (11), or (12):

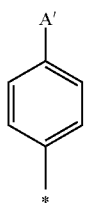

(9)

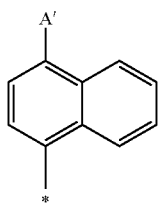

(10)

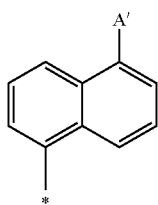

(11)

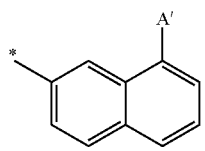

(12)

wherein A' is a monovalent radical selected from the group consisting of *—N(R$^1$)(R$^2$), *—OR$^3$, —SR$^4$, wherein R$^1$, R$^2$, R$^3$, and R$^4$ are independent monovalent radicals comprising at least 1 carbon. The aromatic carbon shown linked to an asterisk is covalently linked to a nitrogen of a nitrogen-containing unit.

Non-limiting exemplary diluent groups include the following groups.

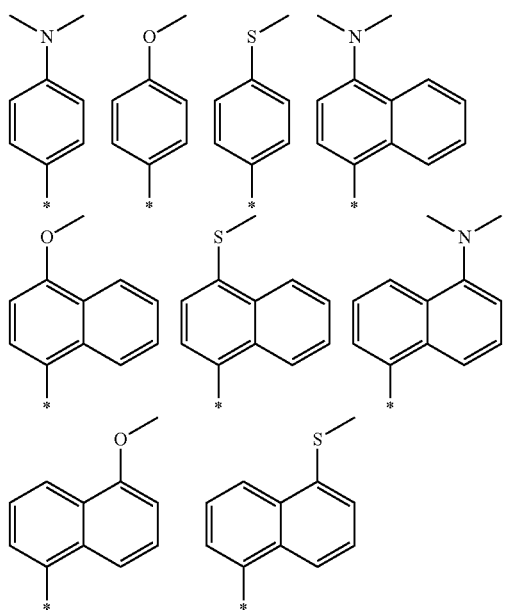

The aromatic carbon shown linked to an asterisk is covalently linked to a nitrogen of nitrogen-containing unit. Diluent groups can be used singularly or in combination.

Methods of Preparation

The disclosed polymers are prepared from monomers comprising two or three primary aromatic amine groups. The monomers have a structure according to formula (13):

$$K'\text{-}(\text{NH}_2)_{y'} \quad (13),$$

wherein y' is 2 or 3, and K' is a divalent or trivalent radical comprising at least one 6-carbon aromatic ring. The monomers can be used singularly or in combination. The amine groups can be present as non-protonated or protonated ammonium salts of a protic acid (e.g., hydrochloric acid, acetic acid, p-toluene sulfonic acid).

The following discussion is directed to diamine monomers. It should be understood that the methods and principles apply to triamine monomers.

More specific monomers are diamines of formula (14):

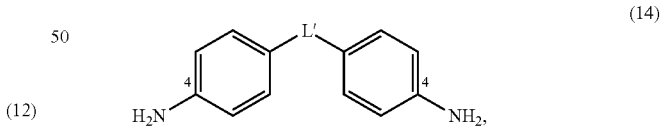

(14)

wherein
carbons para to L' are labeled 4, and
L' is a divalent group selected from the group consisting of *—O—*, *—S—*, *—N(R')—*, *—N(H)—*, and *—R"—*, wherein R' and *—R"—* are independent hydrocarbyl groups comprising at least 1 carbon.

Exemplary non-limiting R' groups of L' include methyl, ethyl, propyl, isopropyl, and phenyl.

Exemplary non-limiting *—R"—* groups of L' include methylene (*—CH$_2$—*), isopropylidenyl (*—C(Me)$_2$-*), and fluorenylidenyl:

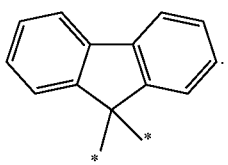

A method of preparing a cured polymer comprises forming a reaction mixture comprising i) a monomer selected from the group consisting of diamine monomers comprising two primary aromatic amine groups, triamine monomers comprising three primary aromatic amine groups, and combinations thereof, ii) an optional diluent monomer comprising one aromatic primary amine group, iii) glyoxal, iv) a water-miscible organic solvent, and v) water. The temperature of the reaction mixture can be about 20° C. to about 120° C., more preferably about 20° C. to about 60° C., and most preferably about 40° C. to about 60° C. Agitating the reaction mixture for about 1 minute to about 24 hours generates a solution comprising an initial polymer. Heating the solution of the initial polymer using one or more independent heating steps, wherein the last heating step is performed at a temperature of 150° C. to 250° C., thereby produces the cured polymer. Water and/or organic solvent can be removed from the solution during one or more of the heating steps. The heating time at any given temperature can be about 1 second to about 24 hours. The cured polymer can be isolated using well-established techniques.

No restriction is placed on the water-miscible organic solvent with the proviso that the organic solvent can dissolve the monomer and optional diluent monomer and the disclosed polymer formed has useful and desirable properties. Exemplary non-limiting water miscible organic solvents include acetonitrile, tetrahydrofuran (THF), dimethoxyethane, 1,4-dioxane, ethanol, iso-propyl alcohol (IPA), N-methyl pyrrolidone (NMP), N,N-dimethylformamide (DMF), dimethylacetamide (DMA), propylene glycol methyl ether acetate (PGMEA), and dimethyl sulfoxide (DMSO)).

As an alternative, applying the solution comprising the initial polymer onto a surface of a substrate produce an initial film layer disposed on the surface. Curing the initial film layer using one or more sequential heating steps, wherein the last heating step is performed at a temperature of 150° C. to 250° C., thereby forms a cured film layer comprising the cured polymer. Water and/or organic solvent can be removed from the initial film layer during one or more of the heating steps. Removing the film layer from the surface of substrate provides a self-supporting film sheet.

The following discussion is directed to diamine monomers. It should be understood that the principles apply to triamine monomers.

The cured polymer can have a glass transition temperature (Tg) in the range of about 190° C. to more than 300° C. When the glyoxal:diamine mole ratio of the initial reaction mixture is in the range of 0.90 to 1.10, the glyoxal residues of the cured polymer are predominantly bis-imine units (A). These more rigid polymers can have a Tg of 278° C. or higher, more specifically 300° C. to about 350° C. When the glyoxal:diamine mole ratio of the initial reaction mixture is in the range of 0.50 to about 0.60, the glyoxal residues of the cured polymer are predominantly bis-aminal units (C). These less rigid highly crosslinked polymers have a Tg of 190° C. to about 205° C. When the glyoxal:diamine mole ratio of the initial reaction mixture is between 0.6 and 0.90, the cured polymer comprises a mixture of glyoxal residues (A), (B), and (C). These cured polymers can have Tg's between about 205° C. and about 278° C.

The higher Tg polymers contain more bis-imine units (A) and can be crosslinked, but are not necessarily so. The lower Tg polymers contain more imine-aminal units (B) and bis-aminal units (C), and are crosslinked.

Cured polymers and films thereof, which are prepared using 0.5 to 1.1 mole equivalents of glyoxal relative to diamine monomer, are generally insoluble in organic solvents, including water-miscible organic solvents (e.g., acetone, tetrahydrofuran, acetonitrile, diethyl ether, dichloromethane, benzene, hexane, N-methyl pyrrolidone (NMP), N,N-dimethylformamide (DMF), propylene glycol methyl ether acetate (PGMEA), dimethyl sulfoxide (DMSO)).

The initial polymer formed (prior to the curing treatment) can comprise above-described optional glyoxal residues.

The initial reaction mixture can have a combined dry weight of diamine monomer plus glyoxal equal to about 1 wt % to about 50 wt %, preferably 10 wt % to 20 wt %, of the total weight of the reaction mixture.

The solution containing the initial polymer can be applied to a surface of a substrate using any suitable technique (e.g., drop coating, spin-coating, roll coating, spray coating, dip coating), thereby forming the initial film.

The mole ratio of glyoxal:total moles of primary aromatic amine groups (e.g., diamine monomer plus optional monoamine monomer) is preferably about 0.5:1 to about 1.1:1.

Non-limiting exemplary diamine monomers comprising two primary aromatic amine groups include 4,4'-oxydianiline (ODA), 4,4'-methylenedianiline (MDA), fluorenylidene)dianiline (FDA), p-phenylenediamine (PD), 1,5-diaminonaphthalene (15DAN), 1,4-diaminonaphthalene (14DAN), and benzidene, which have the following structures:

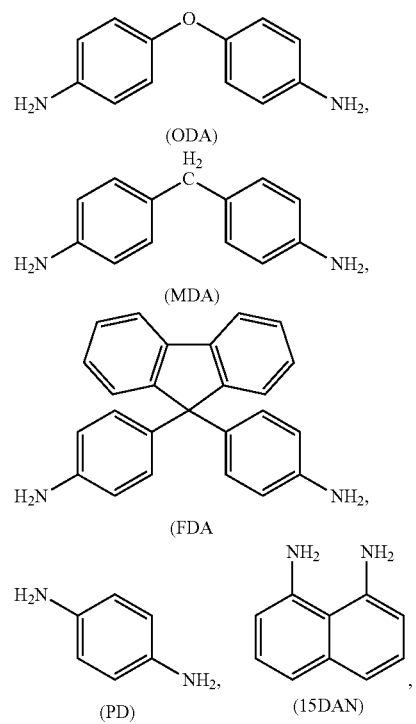

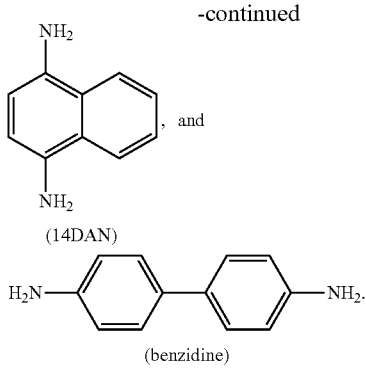

(14DAN)

(benzidine)

Non-limiting exemplary diluent monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), shown below.

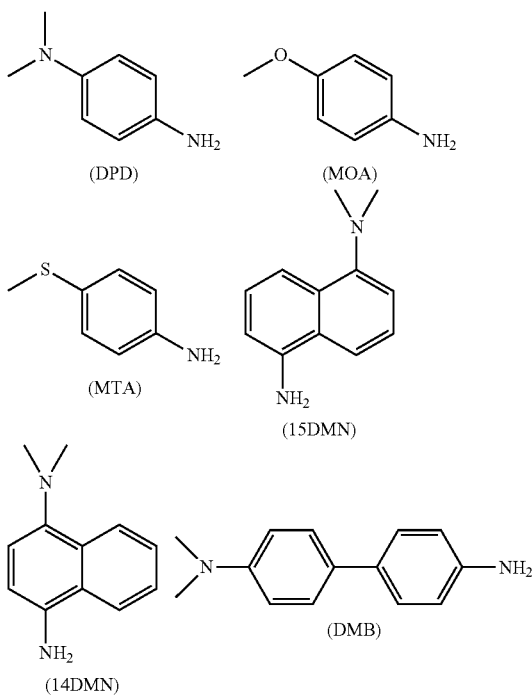

The diluent monomer can be used in an amount of 0 mole % to about 75 mole % based on total moles of monomer and diluent monomer.

Preferred organic solvents for the reaction mixture are polar aprotic solvents having a solubility of about 19 grams or more in 100 grams water or more (e.g., N-methyl-2-pyrrolidone (NMP), dimethylsulfoxide (DMSO), N,N-dimethylformamide (DMF), N,N-dimethylacetamide (DMA), propylene carbonate (PC), and propylene glycol methyl ether acetate (PGMEA). Most preferably, the solvent is NMP).

FIG. 1 is a series of cross-sectional layer diagrams illustrating formation of a film layer comprising the cured polymer. A solution comprising the initial polymer, water miscible organic solvent and water, prepared as described above, is applied to a surface 12 of a substrate 10, thereby forming layered structure 20. Layered structure 20 comprises initial film layer 22 disposed on covered surface 24 of substrate 10. Initial film layer 22 comprises initial polymer, organic solvent, and water. Curing initial film layer 22 using one or more heating steps, wherein the last heating step is conducted at a temperature of about 150° C. to about 250° C. for about 1 minute to about 24 hours, thereby forms layered structure 30. Layered structure 30 comprises film layer 32 disposed on covered surface 34 of substrate 10. Film layer 32 is substantially free of organic solvent and water. Film layer 32 is substantially insoluble in the organic solvent used to prepare the initial polymer, and can be insoluble in other organic solvents.

The substrate can be any suitable substrate. Non-limiting examples of substrate materials include semiconductor wafers (e.g., silicon wafers), most metals, refractory materials, and possibly harder polymers.

The number average molecular weight (Mn) of the cured polymers can be 1000 or more, preferably 5000 or more.

The cured polymers are attractive for applications requiring lightweight, rigid, strong thermosets such as aerospace engineering, electronics, and as mixtures for increasing the modulus of known resins and composites.

The following examples illustrate the preparation of films comprising the cured polymers and their physical properties.

EXAMPLES

Materials used in the following examples are listed in Table 1.

TABLE 1

| ABBREVIATION | DESCRIPTION | SUPPLIER |
| --- | --- | --- |
|  | Glyoxal (40 wt % aqueous solution) | Sigma Aldrich |
| DMF | Dimethylformamide | Sigma Aldrich |
| NMP | N-Methylpyrrolidone | Sigma Aldrich |
| ODA | 4,4'-Oxydianiline | Sigma Aldrich |

Herein, Mn is the number average molecular weight, Mw is the weight average molecular weight, and MW is the molecular weight of one molecule.

N-Methyl-2-pyrrolidone (NMP) and glyoxal (40 wt % aqueous solution) were purchased from Aldrich and used as received. 4,4'-Oxydianiline (ODA) was purchased from Aldrich, and used as received. $d_9$-NMP, $d_6$-DMSO and $CDCl_3$ were purchased from Cambridge Isotope Laboratories (CIL) and used as received.

$^1$H NMR spectra were recorded on a Bruker Avance 400 spectrometer (400 MHz). Chemical shifts are reported in ppm from tetramethylsilane with the solvent resonance as the internal standard ($CDCl_3$: delta 7.26 ppm; $d_6$-DMSO: delta 2.50 ppm; $d_9$-NMP: delta 3.23, 2.58, 1.80; $d_6$-acetone: delta 2.05 ppm).

Infrared (IR) spectra were recorded on a Thermo Nicolet Nexus 670 FT-IR Alpha spectrophotometer using a Nicolet OMNI-Sampler ATR Smart-Accessory, with $v_{max}$ in $cm^{-1}$.

Thermogravimetric analyses (TGA) were performed on a TA Instruments Q500. The samples (5 to 7 mg) were scanned from ambient temperature (RT) to 500° C. at a 5° C./min heating rate under an $N_2$ atmosphere.

Differential scanning calorimetry (DSC) analyses were performed on a TA Instruments Q2000. The samples (5 to 7 mg) were scanned at a 5°/min heating rate in aluminum closed pans. The samples were first subjected to a −80° C.

to 200° C. scan, all reported DSC thermograms represent a second scan from −80° C. to 250-300° C. (first and second scans had similar Tg).

X-ray diffraction (XRD) profiles were obtained on Bruker D8 Discover diffractometer fitted with a 2D detector. All scans were performed in a symmetric theta-2theta geometry using graphite monochromated Cu-$K_\alpha$ x-rays ($\lambda$=1.5418 Å).

Syntheses

Example 1. Preparation of Crosslinked Condensation Polymer Film P-1 by Reaction of 4,4'-Oxydianiline (ODA) with Glyoxal (1.1 Mole Equivalents)

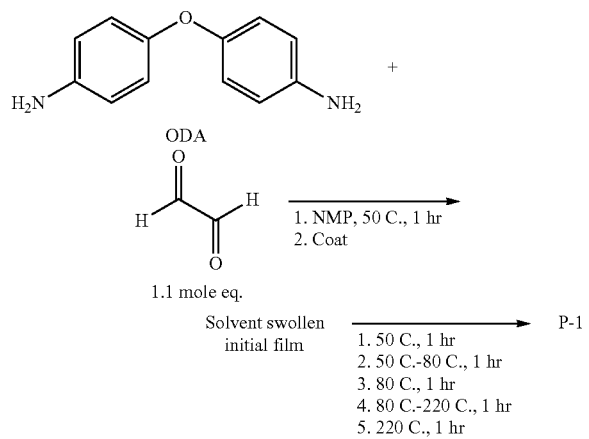

The following procedure is representative. 4,4'-Oxydianiline (ODA, 0.2 g, 1.00 mmol) and glyoxal (0.159 g, 1.10 mmol, 1.10 mole equivalents (mole equiv.) relative to ODA, 40 wt % aqueous solution) were weighed out into a 2-Dram vial. N-methylpyrrolidone (NMP, 2.2 g, 2.14 mL) was added (1.49 M). The vial was capped but not sealed. The reaction mixture was heated in an oil bath at 50° C. for 25 minutes forming a solution in NMP/water that after approximately 0.25 hours began to thicken. The thickened solution was then drop-casted onto a glass slide. The solvent swollen initial film was then cured on a hot plate under a flow of $N_2$ using the following temperature program: 1 hour isotherm at 50° C., ramp from 50° C. to 80° C. over 1 hour, 1 hour isotherm at 80° C., ramp from 80° C. to 220° C. over 1 hour, and 1 hour isotherm at 220° C. The film was peeled off from the glass slide for analysis.

Example 2

Preparation of polymer film P-2. P-2 was made according to the general procedure of Example 1 using ODA (0.4 g, 2.00 mmol) and glyoxal (0.290 g, 2.00 mmol, 1.00 mole equivalents relative to ODA, 40 wt % aqueous solution), and NMP (4.5 g, 4.38 mL).

Example 3

Preparation of polymer film P-3. P-3 was made according to the general procedure of Example 1 using ODA (0.2 g, 1.00 mmol) and glyoxal (0.131 g, 0.90 mmol, 0.90 mole equivalents relative to ODA, 40 wt % aqueous solution), and NMP (2.2 g, 2.14 mL).

Example 4

Preparation of polymer film P-4. P-4 was made according to the general procedure of Example 1 using ODA (0.2 g, 1.00 mmol) and glyoxal (0.109 g, 0.75 mmol, 0.75 mole equivalents relative to ODA, 40 wt % aqueous solution), and NMP (2.2 g, 2.14 mL).

Example 5

Preparation of polymer film P-5. P-5 was made according to the general procedure of Example 1 using ODA (0.4 g, 2.00 mmol) and glyoxal (0.173 g, 1.19 mmol, 0.60 mole equivalents relative to ODA, 40 wt % aqueous solution), and NMP (3 g, 2.92 mL).

Example 6

Preparation of polymer film P-6. P-6 was made according to the general procedure of Example 1 using ODA (0.4 g, 2.00 mmol) and glyoxal (0.144 g, 0.99 mmol, 0.50 mole equivalents relative to ODA, 40 wt % aqueous solution), and NMP (3 g, 2.92 mL).

P-1 to P-6 comprise bis-imine unit (A), imine-aminal unit (B), and/or bis-aminal unit (C). (B) and (C) are crosslinking units.

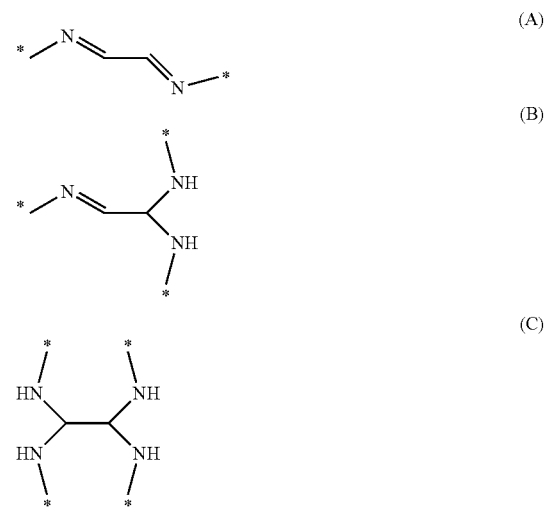

P-1 to P-6 also comprise aromatic bridging groups (D).

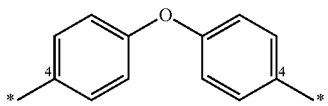

Each nitrogen of a given glyoxal residue is covalently linked to an aromatic carbon 4 of a different divalent bridging group (D). A given polymer chain of P-1 to P-6 can comprise sub-structures (I), (II), and/or (III). Therefore, the polymer network can be branched and/or crosslinked.

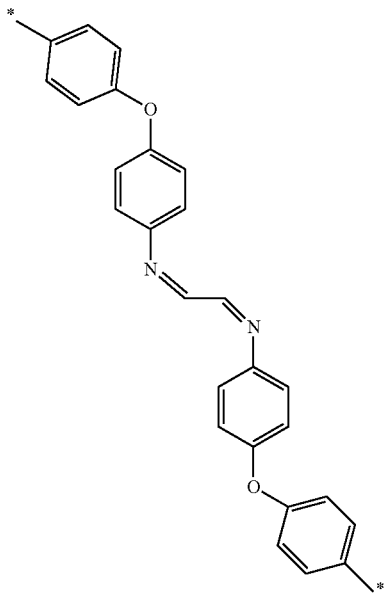

(I)

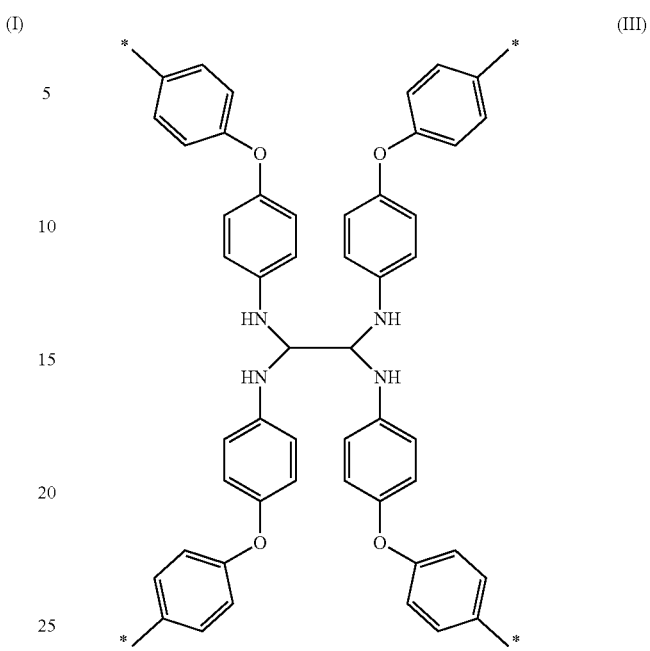

(III)

A given aromatic carbon 4 of a given bridging group (D) can be linked to a nitrogen one of the above glyoxal residues or to a monovalent polymer chain end group, as specified further above.

Example 7 (Comparative). Preparation of Polyhexahydrotriazine (PHT) Film PHT-1

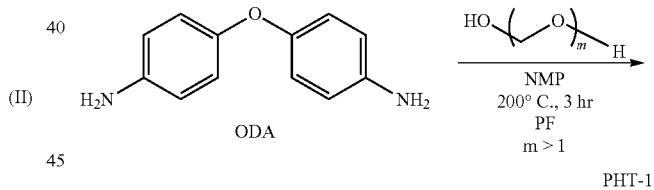

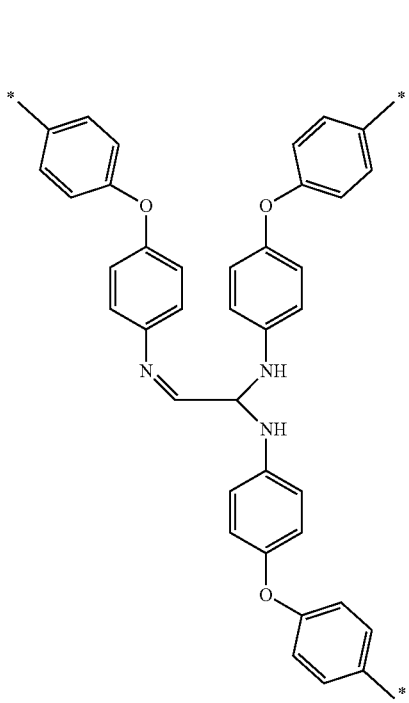

(II)

ODA (0.400 g, 2.0 mmol) and paraformaldehyde (PF, 0.150 g, 5.0 mmol, 2.5 equivalents based on moles, 1.25 equivalents based on reactive groups) were weighed into a 2-Dram vial equipped with a stirbar. NMP (6 mL, 0.33 M with respect to ODA) was added to the vial under nitrogen and the vial was capped. The vial was not sealed. The solution was allowed to stir at 50° C. for 30 minutes (time sufficient for solubility of reagents in NMP). The clear and colorless solution was then filtered through a nylon syringe filter (0.45 micrometer) onto a leveled glass plate with aluminum tape (80 micrometers thickness) boundaries and allowed to cure according to the following ramping procedure: 22° C. to 50° C. over 1 hour; then 50° C. to 200° C. over 1 hour, and hold at 200° C. for 1 hour. The yellow film was then carefully peeled from the glass plate using a razor blade. IR (film), $v_{max}$ (cm$^{-1}$): 3042 (w), 2815 (w), 1679 (w), 1495 (s), 1385 (w), 1211 (s), 1111 (w), 985 (w), 936 (w), 871 (w), 826 (w).

Polymer film PHT-1 is a crosslinked network comprising hexahydrotriazine units (E) alternatingly linked to bridging groups (D).

(E)

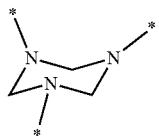

Each nitrogen of a given hexahydrotriazine unit is covalently linked to an aromatic carbon 4 of a different divalent bridging group (D), as shown in structure (IV).

(IV)

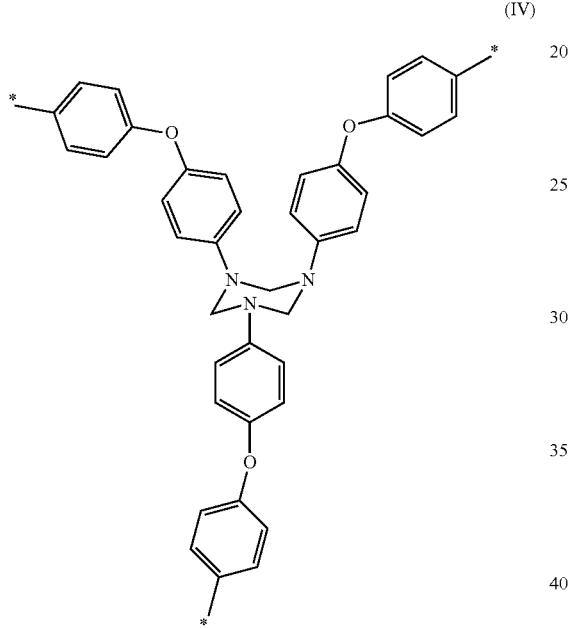

A given aromatic carbon 4 of a given bridging group (D) of PHT-1 can be linked to a nitrogen a hexahydrotriazine group or to a monovalent polymer chain terminating end group. Non-limiting examples of monovalent end groups of the PHT include:

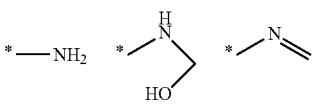

Example 8

Preparation of polyhexahydrotriazine film PHT-2. PHT-2 was prepared according to Example 7 using an ODA:PF mole ratio of 1:5.

Example 9

Preparation of polyhexahydrotriazine film PHT-3. PHT-3 was prepared according to Example 7 using an ODA:PF mole ratio of 1:10.

Table 2 summarizes the preparations of Examples 1-7. Mole equivalents=moles aldehyde/moles ODA.

TABLE 2

| Example | Film | Aldehyde | | | ODA | | Aldehyde:ODA | NMP | Reaction conditions | Film |
| --- | --- | --- | --- | --- | --- | --- | --- | --- | --- | --- |
| | | | (g) | (mmol) | (g) | (mmol) | (mole ratio) | (g) | before casting | Color |
| 1 | P-1 | glyoxal | 0.159 | 1.10 | 0.2 | 1.00 | 1.10 | 2.2 | 50° C., 25 min | brown |
| 2 | P-2 | glyoxal | 0.290 | 2.00 | 0.4 | 2.00 | 1.00 | 4.5 | 50° C., 20 min | brown |
| 3 | P-3 | glyoxal | 0.131 | 0.90 | 0.2 | 2.00 | 0.90 | 2.2 | 50° C., 25 min | brown |
| 4 | P-4 | glyoxal | 0.109 | 0.75 | 0.2 | 1.00 | 0.75 | 2.2 | 50° C., 40 min | brown |
| 5 | P-5 | glyoxal | 0.173 | 1.19 | 0.4 | 2.00 | 0.60 | 3 | 50° C., 1 hr 20 min | brown |
| 6 | P-6 | glyoxal | 0.144 | 0.99 | 0.4 | 2.00 | 0.50 | 3 | 50° C., 1 hr 20 min | brown |
| 7 | PHT-1 | PF | 0.15 | 5.00 | 0.40 | 2.00 | 2.5 | 6.2 | 50° C., 0.5 hr, | yellow |
| 8 | PHT-2 | PF | 0.30 | 10.0 | 0.40 | 2.00 | 5.0 | 6.2 | 50° C., 0.5 hr, | brown |
| 9 | PHT-3 | PF | 0.60 | 20.0 | 0.40 | 2.00 | 10.0 | 6.2 | 50° C., 0.5 hr, | brown |

Figure 2:
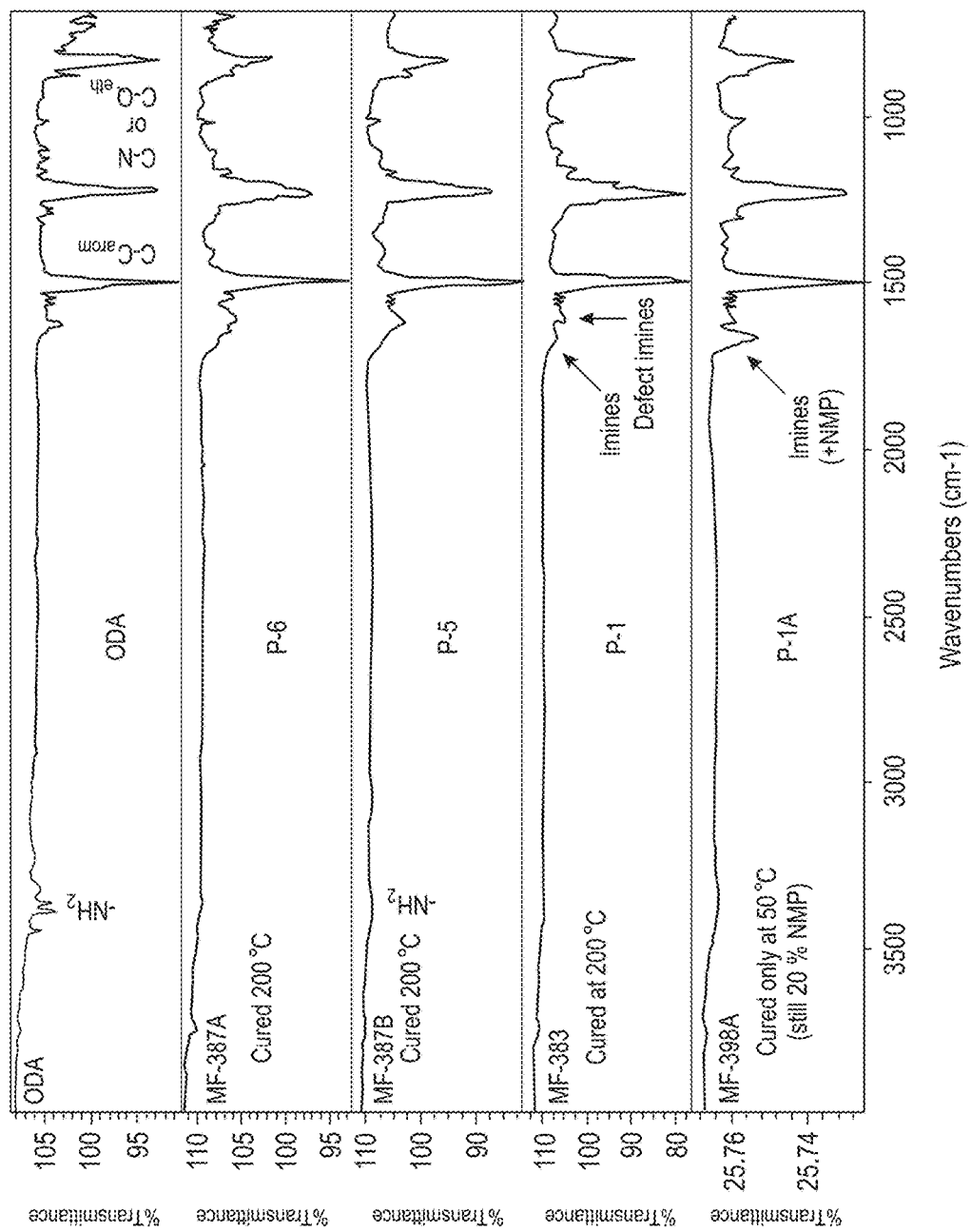
FIG. 2 is a set of infrared spectrograms comparing ODA to polymer films P-1, P-1A (same as P-1 cured only at 50° C.), P-5, and P-6.

FIG. 2 is a set of infrared spectrograms comparing ODA to polymer films P-1, P-5, P-6, and P-1A (P1-A is the same as P-1 cured only at 50° C.).

Table 3 summarizes the thermal properties of polymer films P-1 to P-6 and PHT-1 to PHT-3. T2% and T5% refer to the TGA temperature at which 2% and 5% of the mass of the polymer had decreased, respectively, while heating at a rate of 5° C./minute. Tg is the glass transition temperature as measured by DSC while heating at a rate of 5° C./minute. T2%, T5%, and Tg of P-1A were not measured due to the presence of solvent NMP.

TABLE 3

| Example | Film | Aldehyde | Aldehyde:ODA (mole ratio) | T2% (° C., TGA) | T5% (° C., TGA) | Tg (° C., DSC) |
|---|---|---|---|---|---|---|
| 1 | P-1 | glyoxal | 1.10 | 237 | 304 | >T5% |
| 2 | P-2 | glyoxal | 1.00 | 256 | 305 | >T5% |
| 3 | P-3 | glyoxal | 0.90 | 214 | 278 | >T5% |
| 4 | P-4 | glyoxal | 0.75 | 244 | 278 | 207 |
| 5 | P-5 | glyoxal | 0.60 | 230 | 266 | 201 |
| 6 | P-6 | glyoxal | 0.50 | 231 | 267 | 194 |
| 7 | PHT-1 | PF | 2.5 | Not measured | 238 | 193 |
| 8 | PHT-2 | PF | 5.0 | Not measured | 275 | 218 |
| 9 | PHT-3 | PF | 10.0 | Not measured | 238 | 200 |

Figure 3:
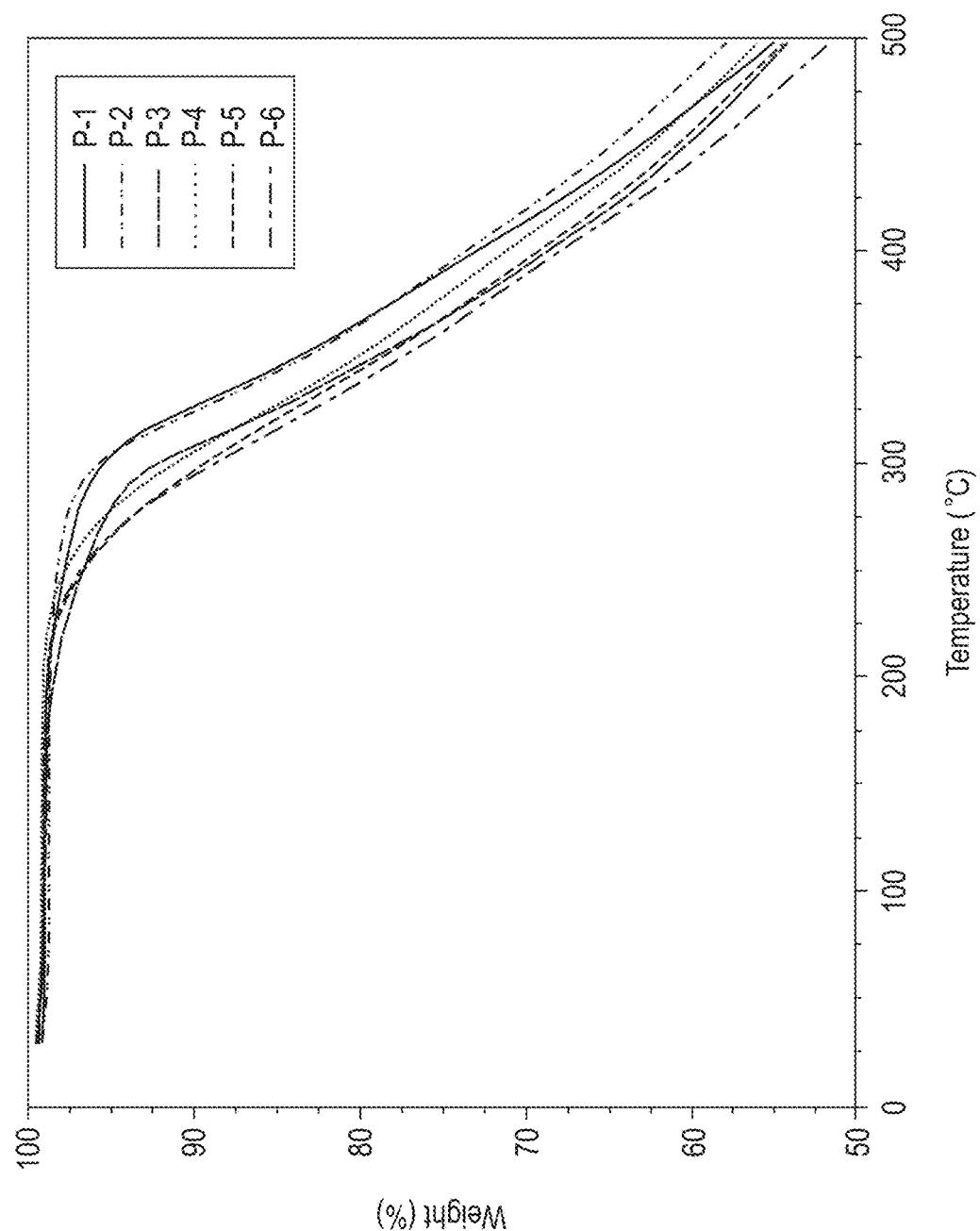
FIG. 3 is a graph showing the thermogravimetric analysis (TGA) of polymer films P-1 to P-6 prepared with 4,4'-oxydianiline (ODA) and glyoxal.
Figure 4:
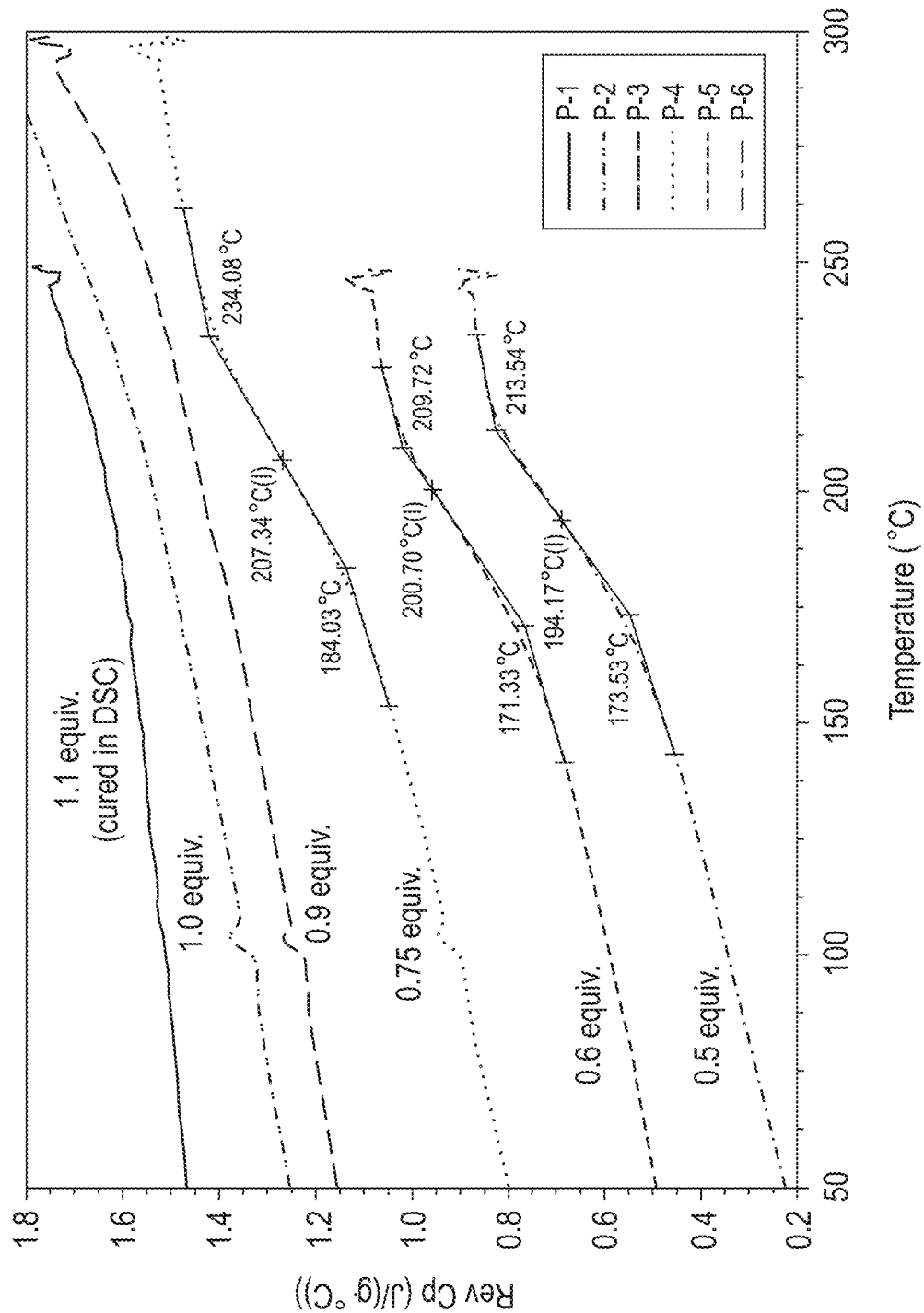
FIG. 4 is a graph showing the differential scanning calorimetry (DSC) analysis of polymer films P-1 to P-6.

FIG. 3 is a graph showing the TGA traces of polymer films P-1 to P-6 prepared with 4,4'-oxydianiline (ODA) and glyoxal. FIG. 4 is a graph showing the DSC thermograms for polymer films P-1 to P-6.

As shown in Table 3, the polyimine films with the highest glyoxal content (≥0.9 mole equivalents relative to ODA) did not exhibit any Tg (P-1 to P-3) up to T5%. The T5% of polyimines P-1 and P-2 was also above 300° C. By comparison, Tg was lower (218° C. or less) and T5% was lower (275° C. or less) for polyhexahydrotriazines PHT-1, PHT-2, and PHT-3 prepared with 2.5, 5.0, and 10.0 mole equivalents PF, respectively.

Each of the films P-1 to P-6 and PHT-1 to PHT-3 was insoluble in NMP after the high temperature cure. For example, P-1 swelled less than 3% after 24 hour immersion in NMP. PHT-1 film swelled 1.9%.

X-Ray diffraction measurements showed that film P-2 was amorphous. Other films were not determined.

As evidenced by NMR model studies and DFT calculations (FIGS. 10 and 11, and further below), the bis-imine unit (A) is the kinetic product, and the bis-aminal unit (C) is the thermodynamic product. The initial polymer formed at low temperature contains glyoxal residues predominantly in the form of bis-imine units (A). Despite the bis-imine being the higher energy group (FIG. 11, "int11" versus "tetamn"), the bis-imine units (A) exhibit good stability during the cure process, allowing for the removal of water and NMP at high temperature to form a cured polymer whose glyoxal residues are also substantially in the form of bis-imine units (A). The rigidity of the bis-imine units (A) coupled with crosslinking provided by imine-aminal units (B) and/or bis-aminal units (C) contribute to the cured polymer having a Tg above 200° C. and a T5% above 275° C. Although the percent of crosslinking is not known, the low swell and the organic solvent resistance of the cured polymers indicate some crosslinking was present in each of P1 to P-6.

Model NMR Studies

Model studies were performed in solution using aniline and p-methoxyaniline as model aromatic amines and hexylamine as a model aliphatic amine. The ratio of amine vs. glyoxal was varied from 2 to 4 and the products were analyzed by $^1$H NMR spectroscopy. The results are summarized in Scheme 2.

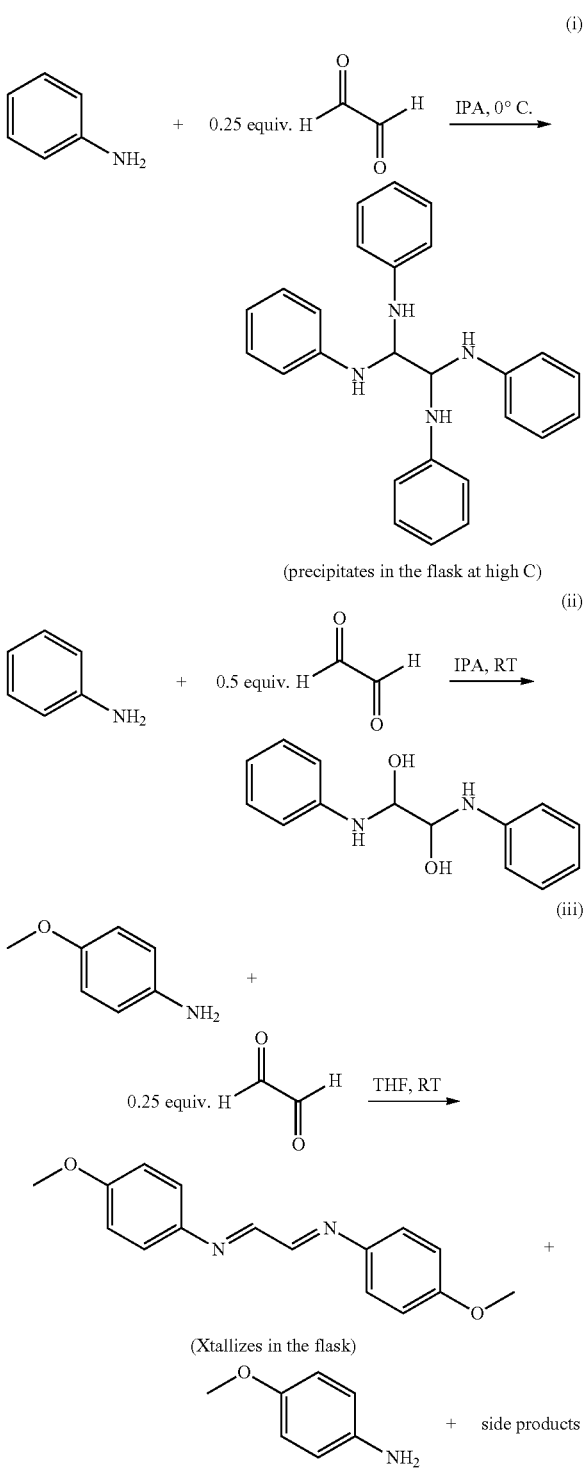

Scheme 2

Figure 8:
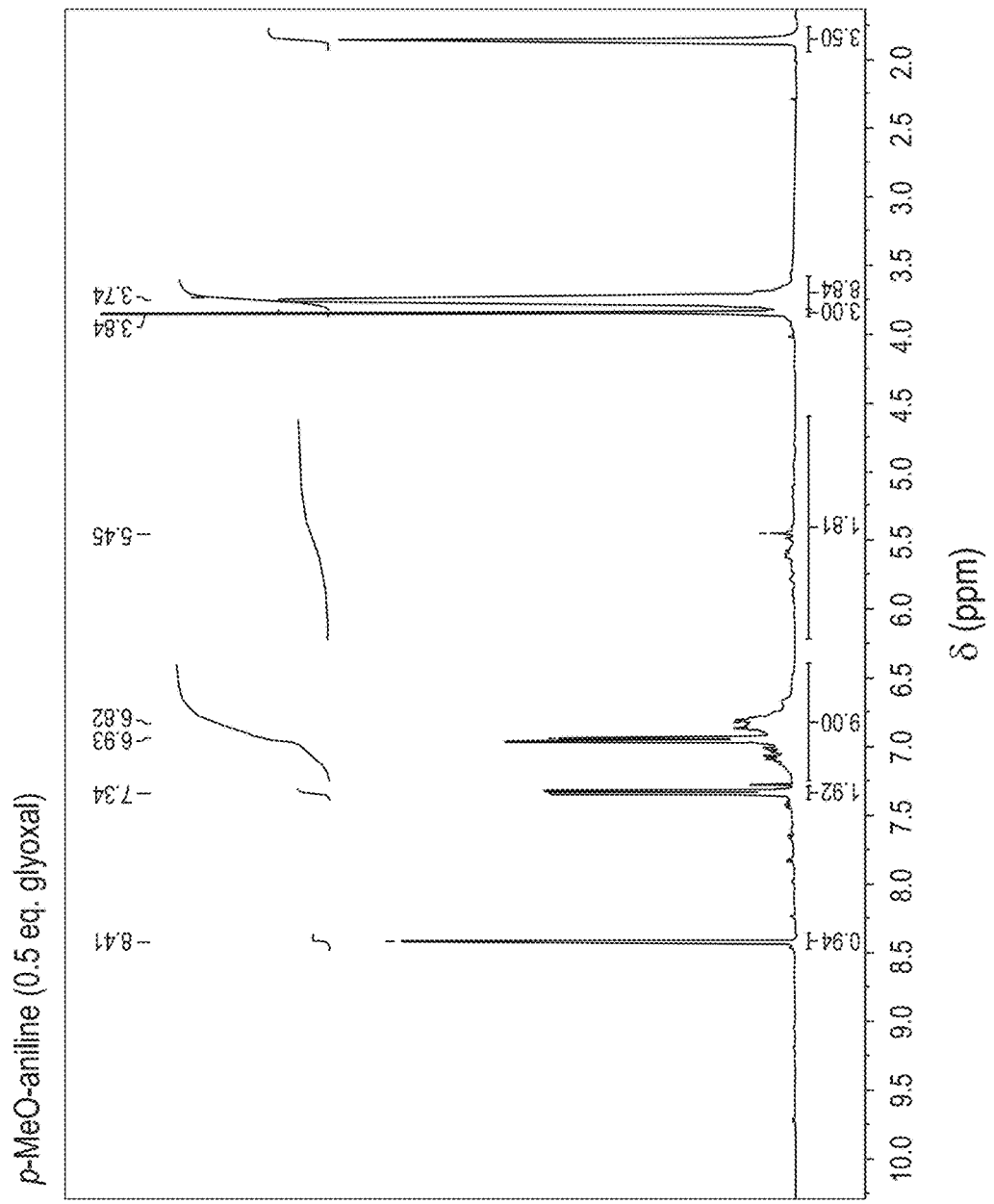
FIG. 8 is a $^1$H NMR spectrum of the crude bis-imine product formed with 0.50 mole equivalents glyoxal formed by the reaction of Scheme 2 (iv).

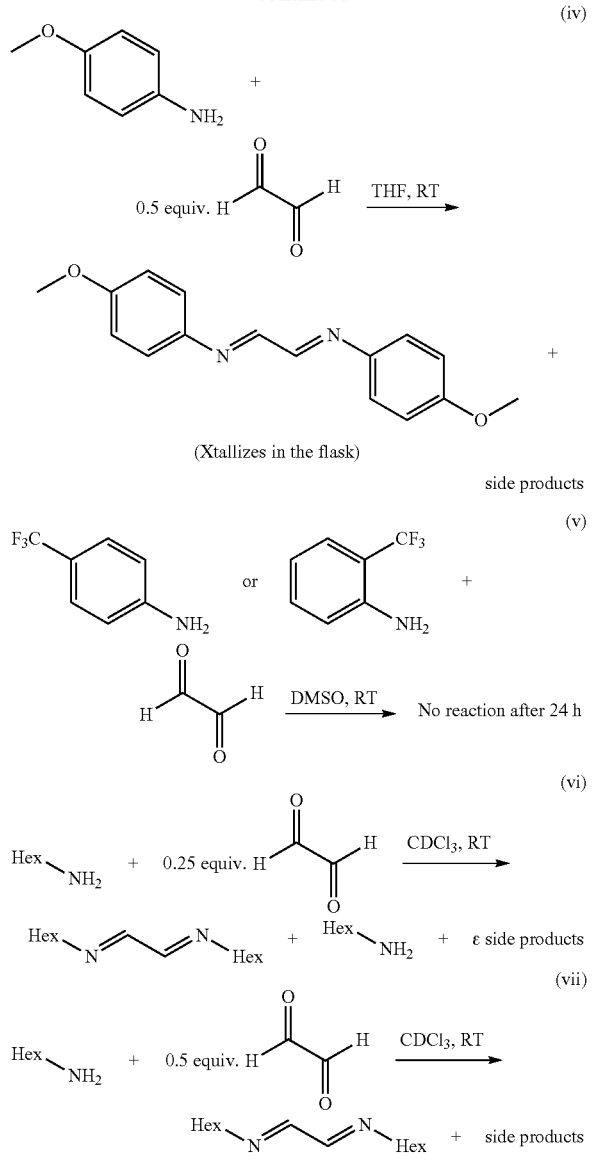

derivatives, as shown in Scheme 2 (iii) and (iv), FIGS. 7A-7B and FIG. 8, respectively. FIG. 7A is an NMR spectrum of p-methoxyaniline. FIG. 7B is an NMR spectrum of the bis-imine product formed with 0.25 mole equivalents glyoxal. FIG. 8 is an NMR spectrum of the crude bis-imine product formed with 0.50 mole equivalents glyoxal.

Reacting glyoxal with 0.25 mole equivalents or 0.50 mole equivalents of hexylamine in $CDC_3$ produced mainly bis-imine derivatives, as shown in Scheme 2 (vi) and (vii), respectively, and FIGS. 9A-9C NMR). FIG. 9A is an NMR spectrum of n-hexylamine. FIG. 9B is an NMR spectrum of the crude bis-imine product formed with 0.50 mole equivalents glyoxal. FIG. 9C is an NMR spectrum of the crude bis-imine product formed with 0.25 mole equivalents glyoxal.

For p-methoxyaniline and hexylamine, trace amounts of impurities (about 10%) were detected by NMR that could not be identified. Without being bound by theory, the impurities are thought to be bis-aminals and/or alpha-hydroxy amines that are difficult to isolate.

Switching the substituents on the aniline to an electron-withdrawing —$CF_3$ group as shown in Scheme 2 (v) resulted in no yield of imine or aminal, as no change in the $^1H$ NMR signals was observed after a 24 hour reaction time in DMSO. Heating the solution to 50° C. for 72 hours produced trace side products that could not be identified, the main component being still the free amine.

Density Functional Theory (DFT) Calculations

Computational studies with the M06-2X density functional theory method and the aug-cc-pVDZ//6-311+G(2d,p) basis sets in (SMD)DMF implicit solvent were performed on the formation of bis-aminal from the reaction of 4 equivalents of methylamine with glyoxal. This process is catalyzed by 2 molecules of water, which acts as a co-catalyst and produces 4 molecules of water as side-product (Scheme 3).

Scheme 3

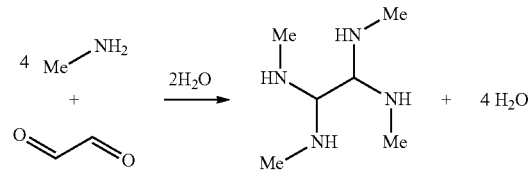

Figure 10A:
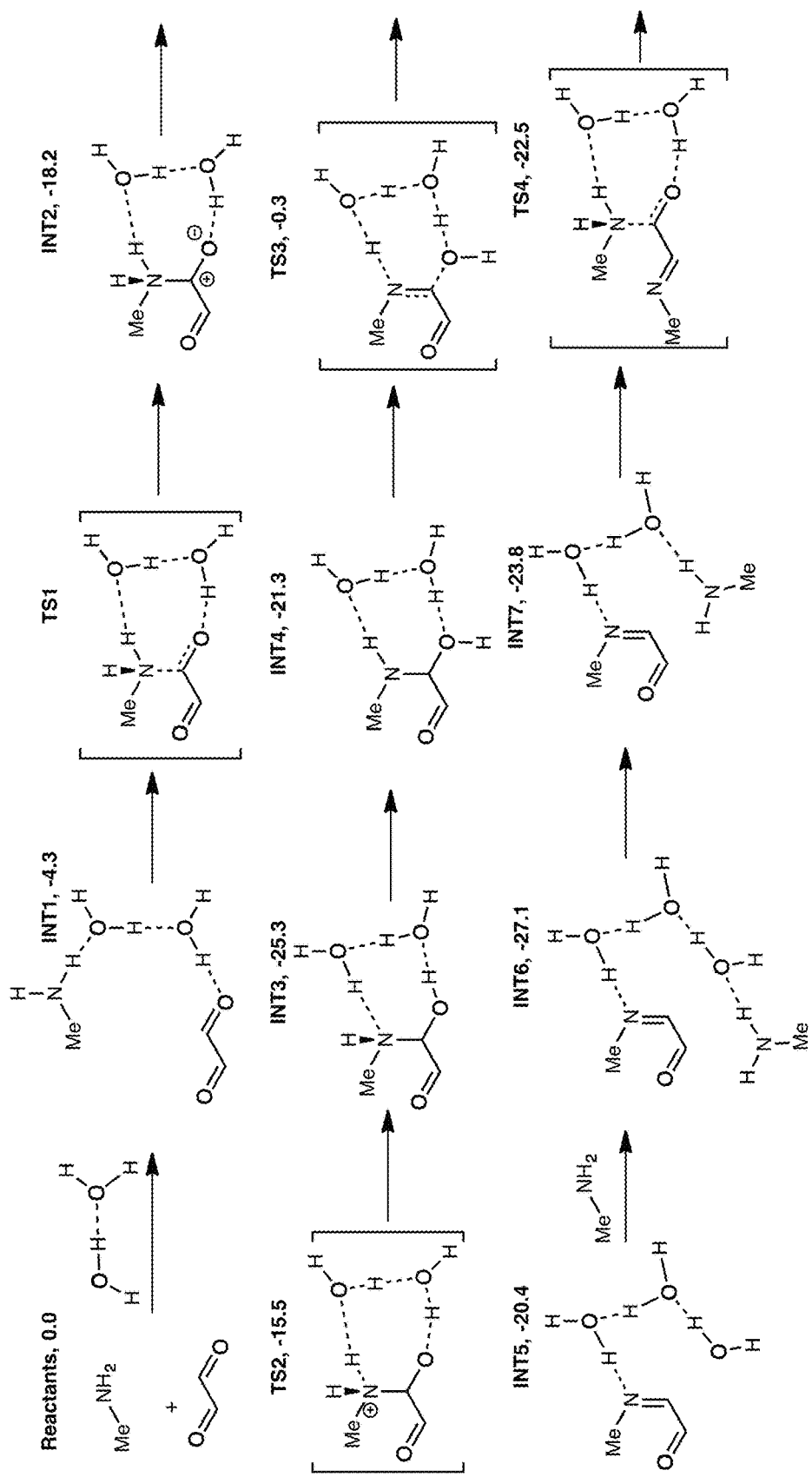
FIG. 10A is a reaction diagram showing the mechanism and free energies, in kcal/mol, of each step of the reaction of methylamine with glyoxal, resulting in a hydrated imine-aminal intermediate.
Figure 10B:
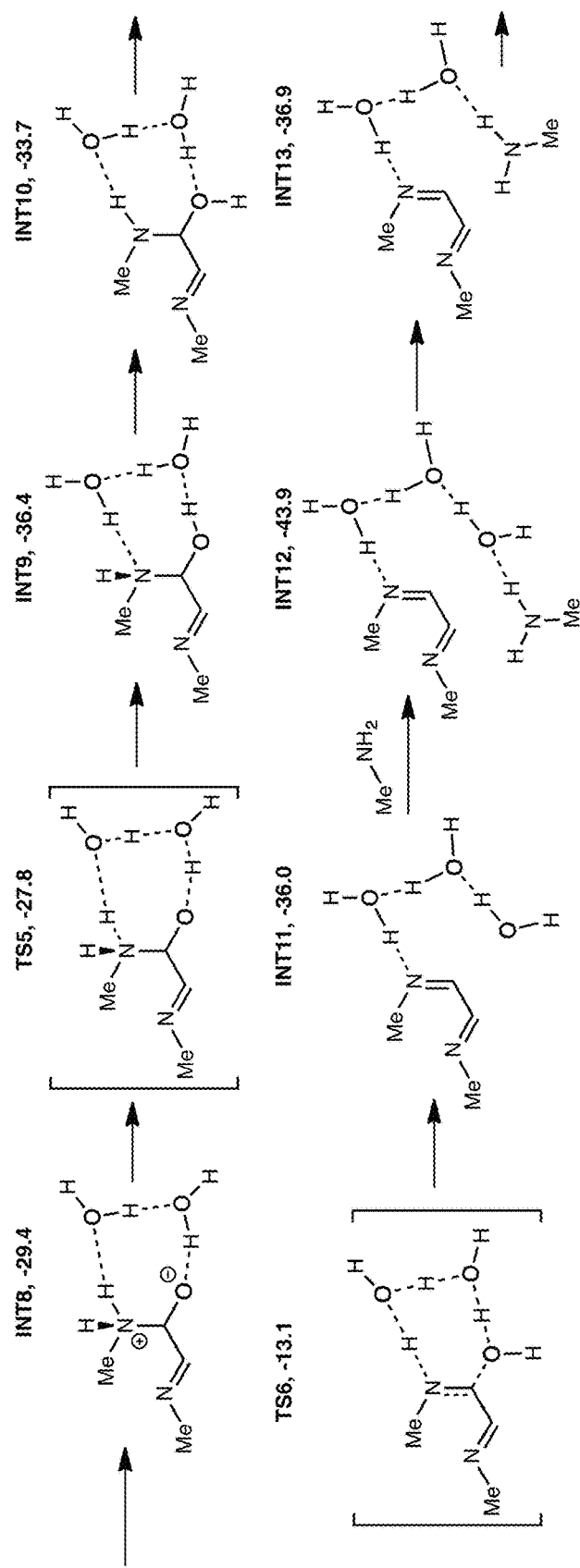
FIG. 10B is a continuation of the reaction diagram of FIG. 10A showing the mechanism and free energies, in kcal/mol, of each step of the conversion of the hydrated imine-aminal intermediate to hydrated di-imine intermediate.
Figure 10C:
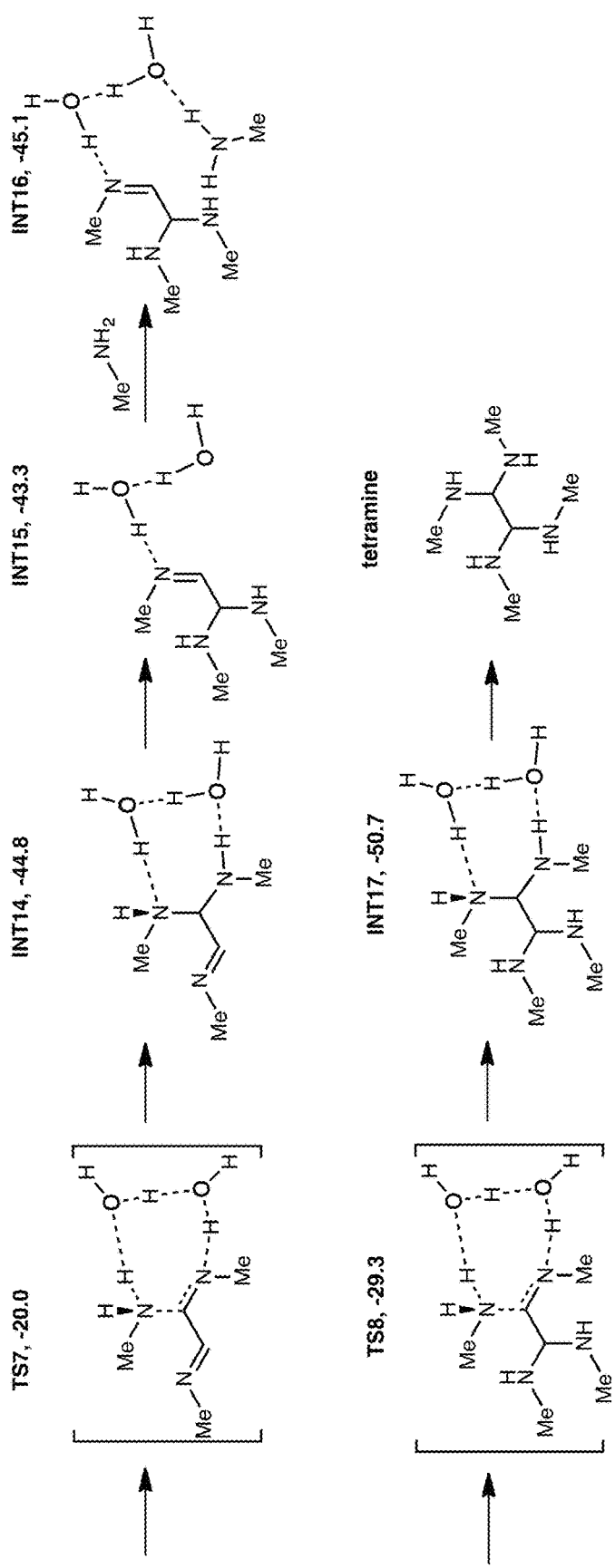
FIG. 10C is a continuation of the reaction diagram of FIG. 10B showing the mechanism and free energies, in kcal/mol, of each step of the conversion of the hydrated di-imine intermediate to bis-aminal.
Figure 11:
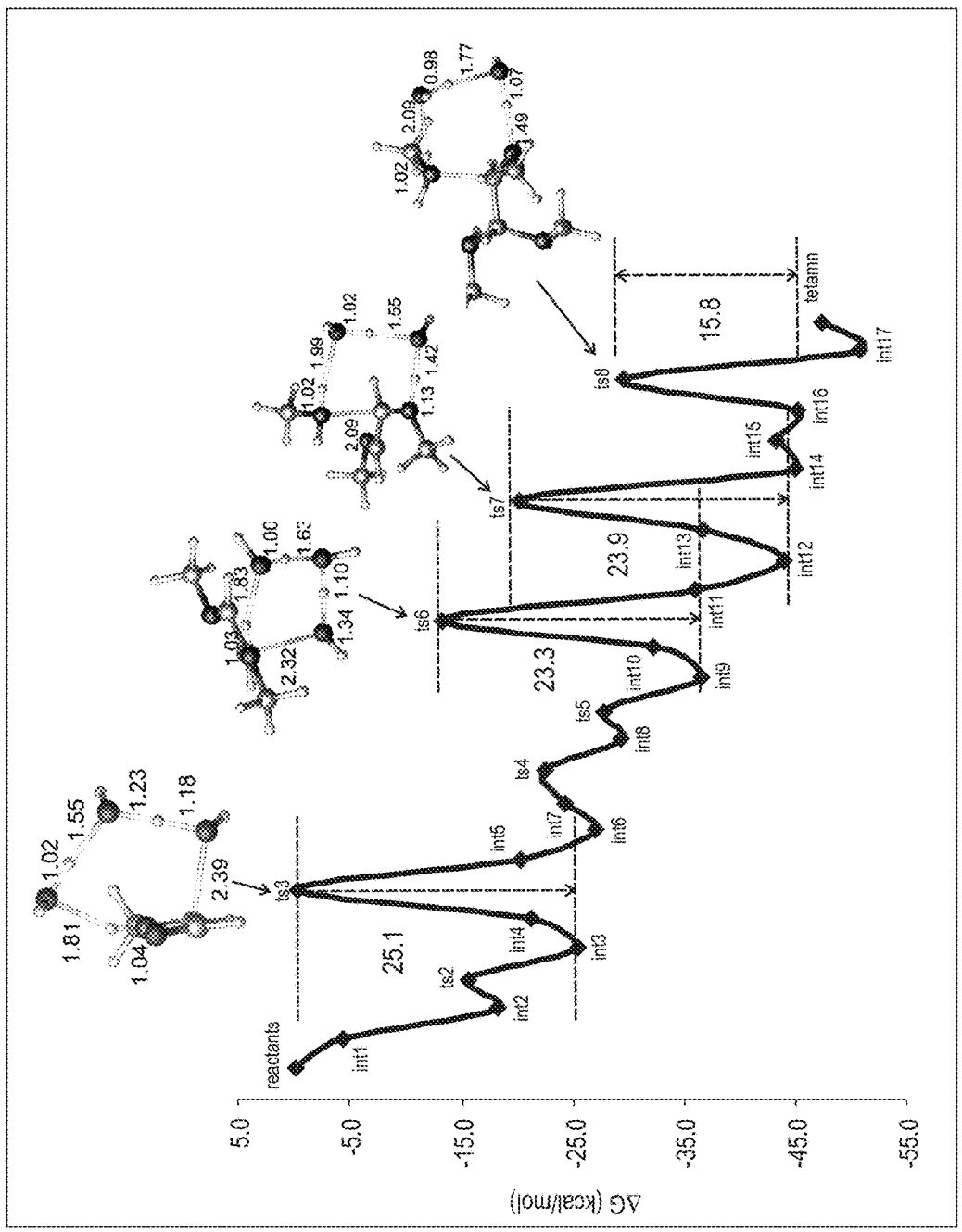
FIG. 11 is a graph showing the free energy surface and key stationary points for the reaction of methylamine with glyoxal. Structures of the intermediates and transition states are shown in FIGS. 10A-10C.

The mechanism of the reaction is shown in FIGS. 10A-10C and the free energy surface of the reaction is shown in FIG. 11. The mechanism is a multi-step process that involves formation of imines and secondary amines from the sequential (1) addition of methylamine to carbonyl groups to form hemi-aminals, (2) the loss of water from hemi-aminals to form imines, and (3) the addition of methylamine to imines and formation of secondary amines of the aminal group. FIG. 10A is a reaction diagram showing the mechanism and free energies, in kcal/mol, of each step of the reaction of methylamine with glyoxal, resulting in a hydrated imine-aminal intermediate. FIG. 10B is a continuation of the reaction diagram of FIG. 10A showing the mechanism and free energies, in kcal/mol, of each step of the conversion of the hydrated imine-aminal intermediate to hydrated di-imine intermediate. FIG. 10C is a continuation of the reaction diagram of FIG. 10B showing the mechanism and free energies, in kcal/mol, of each step of the conversion of the hydrated di-imine intermediate to bis-aminal. Calculations predict that the free energy barriers for addition of methyl- Referring to Scheme 2 (i), the reaction of 0.25 mole equivalents of glyoxal per mole of aniline allowed the precipitation of bis-aminal at low temperature in isopropyl alcohol (IPA). The bis-aminal, isolated as a white powder by filtration, had limited stability. Dissolving the white powder in $CDCl_3$ produced a yellow solution that was analyzed by $^1H$ NMR as containing imine derivatives. FIG. 5A is an NMR spectrum of aniline. FIG. 5B is an NMR spectrum of the fresh solution of white powder in $CDCl_3$. FIG. 5C is an NMR spectrum of the solution of white powder in $CDCl_3$ after 1 hour. Additionally, a yellow paste was obtained after leaving the powder at ambient temperature under air, most probably owing to the formation of imine products.

alpha-Hydroxy-amino adducts were observed while mixing aniline with 0.5 equivalents glyoxal (Scheme 2 (ii) and FIGS. 6A-6C ($^1H$ NMR). FIG. 6A is an NMR spectrum of the crude reaction mixture. FIG. 6B is an NMR spectrum of the mixture of isolated bis-aminal and bis-imine products. FIG. 6C is an NMR spectrum of aniline.

Reacting glyoxal with 0.25 mole equivalents or 0.50 mole equivalents of p-methoxyaniline produced mainly imine amine to the carbonyls are low (if they can be measured at all). For example, the barrier for addition of a second methylamine in TS4 has a barrier of only 4.6 kcal/mol with respect to INT6, the lowest energy intermediate which precedes it. The transition structure for the initial addition of methylamine to glyoxal could not be located, presumably due to the fact that the free energy barrier is so low.

The free energy barriers for the additions of methylamine to the imine groups are comparatively larger than the barrier for additions of methylamine to the carbonyl groups. The transition structures (TS7 and TS8) possess barriers of about 24 and 16 kcal/mol with respect to the preceding lowest energy intermediates (INT12 and INT16), respectively. Water loss (imine formation) from hemi-aminals is also a high barrier process; the free energy barriers for TS3 and TS6 possess free energy barriers of 25 and 23 kcal/mol with respect to INT3 and INT9, respectively.

Overall, the computed results indicate that less hindered amines, such as methylamine, will condense with glyoxal to form higher order bis-aminals. More hindered amines such as aniline and ODA are more likely to form imine products because the barrier for the addition of an unhindered amine to an unhindered imine is inherently large, and the barrier is expected to be even greater for addition of an aromatic amine to an aromatic imine formed therefrom.

CONCLUSION

Various films were prepared by the condensation polymerization of aromatic diamine ODA with glyoxal. The process is less toxic compared to comparable processes using paraformaldehyde. The thermomechanical properties of the films varied with the amount of glyoxal relative to ODA. For example, the thermal stability of the resins increased with increasing glyoxal content from 0.50 to 1.10 molar equivalents relative to ODA, which allowed for efficient and quantitative removal of NMP solvent while curing, as confirmed by thermogravimetric analysis. All cured films were solvent resistant. As highlighted by computational studies and model studies on small molecules, the glyoxal residues of the polymer network are predominantly bis-imine units (A), with substantially less imine-aminal units (B) and bis-aminal units (C) providing crosslinking.

Electron-deficient aromatic amine was generally unreactive towards glyoxal. Formation of imine, hemiaminal, and aminal groups using glyoxal are favored by electron-rich aromatic amines. Films having T5% greater than or equal to 278° C. and Tg's from 207° C. to >T5% were prepared using 0.75 to 1.10 molar equivalents of glyoxal relative to ODA. The T5% of the disclosed films exceeded the highest values obtained for films prepared with paraformaldehyde (T5%=238-275° C.). The Tg of the disclosed films was also much higher for glyoxal content of 0.9 to 1.0 mole equivalents. Decreasing the amount of glyoxal lowered Tg to the 194-201° C. and lowered T5% to about 266° C.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:
1. A polymer, comprising:
i) a nitrogen-containing unit selected from the group consisting of:
divalent bis-imine units of structure (A):

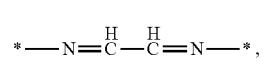

(A)

trivalent imine-aminal units of structure (B):

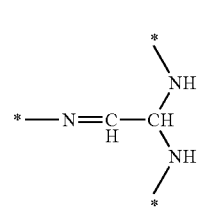

(B)

tetravalent bis-aminal units of structure (C):

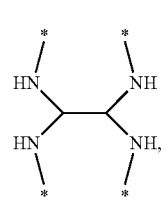

(C)

and
combinations thereof;
ii) divalent and/or trivalent bridging groups of formula (1):

(1), wherein y' is 2 or 3, and K' is a radical comprising at least one 6-carbon aromatic ring; and
iii) polymer chain-terminating monovalent end groups;
wherein
each nitrogen of a given one of the nitrogen-containing units is covalently linked to an aromatic carbon of a different one of the bridging groups, and
the end groups are covalently linked to respective bridging groups.
2. The polymer of claim 1, wherein the polymer comprises divalent bridging units of formula (8):

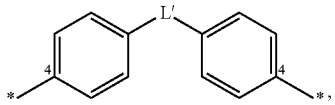

(8)

wherein
- carbons para to L' are labeled 4,
- L' is a divalent group selected from the group consisting of *—O—*, *—S—*, *—N(R')—*, *—N(H)—*, and *—R"—*, wherein R' and *—R"—* are independent hydrocarbyl groups comprising at least 1 carbon,
- each nitrogen of a given glyoxal residue, when present, is covalently linked to a carbon para to L' of a different one of the bridging units, and
- the end groups are covalently linked to respective carbons para to L' of respective bridging groups.

3. The polymer of claim 2, wherein L' is *—O—*.

4. The polymer of claim 2, wherein L' is *—S—*.

5. The polymer of claim 2, wherein R' is selected from the group consisting of methyl, ethyl, propyl, isopropyl, and phenyl, and *—R"—* is selected from the group consisting of methylene (*—CH$_2$—*), ethan-1,2-diyl (*—CH$_2$CH$_2$—*), ethen-1,2-diyl (*—CH=CH—*), isopropylidenyl, and fluorenylidenyl:

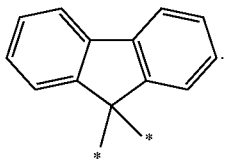

6. The polymer of claim 5, wherein L' is *—R"—*, and *—R"—* is *—CH$_2$—*.

7. The polymer of claim 2, wherein L' is *—R"—*, and *—R"—* is *—C(Me)$_2$—*.

8. The polymer of claim 1, wherein the polymer has a glass transition temperature greater than 190° C.

9. The polymer of claim 1, wherein the polymer is crosslinked.

10. The polymer of claim 1, wherein the polymer is a product of a reaction of glyoxal and a diamine monomer of formula (14):

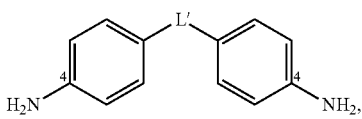

(14)

wherein
- carbons para to L' are labeled 4, and
- L' is a divalent group selected from the group consisting of *—O—*, *—S—*, *—N(R')—*, *—N(H)—*, and *—R"—*, wherein R' and *—R"—* are independent hydrocarbyl groups comprising at least 1 carbon.

11. A method of forming the polymer of claim 1, comprising:
- agitating a reaction mixture comprising i) a monomer selected from the group consisting of diamine monomers comprising two primary aromatic amine groups, triamine monomers comprising three primary aromatic amine groups, and combinations thereof, ii) an optional diluent monomer comprising one aromatic primary amine group, iii) glyoxal, iv) a water-miscible organic solvent, and v) water, thereby forming a solution comprising an initial polymer; and
- heating the solution using one or more independent heating steps that includes a last heating step, wherein the last heating step is performed at a temperature of 150° C. to 250° C., thereby producing the polymer.

12. The method of claim 11, wherein the monomer is a diamine monomer of formula (14):

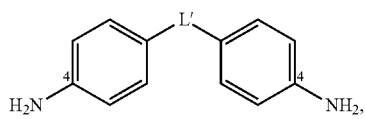

(14)

wherein
- carbons para to L' are labeled 4, and
- L' is a divalent group selected from the group consisting of *—O—*, *—S—*, *—N(R')—*, *—N(H)—*, and *—R"—*, wherein R' and *—R"—* are independent hydrocarbyl groups comprising at least 1 carbon.

13. The method of claim 12, wherein L' of the diamine is *—O—*.

14. The method of claim 12, wherein the organic solvent is N-methyl pyrrolidone (NMP).

15. The method of claim 12, wherein the glyoxal/diamine monomer mole ratio has a value in the range of 0.90 to 1.1.

16. The method of claim 15, wherein the polymer has a Tg greater than 300° C. as measured by differential scanning calorimetry.

17. The method of claim 12, wherein the glyoxal/diamine mole ratio of the mixture has a value in the range of 0.50 to less than 0.90.

18. The method of claim 17, wherein the film has a Tg in the range of 194° C. to about 250° C. as measured by differential scanning calorimetry.

19. A film layer comprising the polymer of claim 1.

20. A method of forming the film layer of claim 19, comprising:
- agitating a reaction mixture comprising i) a monomer selected from the group consisting of diamine monomers comprising two primary aromatic amine groups, triamine monomers comprising three primary aromatic amine groups, and combinations thereof, ii) an optional diluent monomer comprising one aromatic primary amine group, iii) glyoxal, iv) a water-miscible organic solvent, and v) water, thereby forming a solution comprising an initial polymer;
- applying the solution to a surface of a substrate, thereby forming an initial film layer disposed on the surface; and
- curing the initial film layer using one or more sequential heating steps that includes a last heating step, wherein the last heating step is performed at a temperature of 150° C. to 250° C., thereby forming the film layer.

21. The method of claim 20, wherein the film layer has a glass transition temperature (Tg) greater than 190° C. as measured by differential scanning calorimetry.

22. A polymer comprising a plurality of units selected from the group consisting of divalent bis-imine units, trivalent imine-aminal units, tetravalent bis-aminal units, and combinations thereof, wherein the units are covalently linked to divalent or trivalent bridging groups;

wherein the bridging groups comprise at least one 6-carbon aromatic ring, aminal groups of the imine-aminal units and bis-aminal units comprise respective secondary nitrogens, and nitrogens of the bis-imine units, imine-aminal units, and bis-aminal units are linked to respective aromatic carbons of the bridging groups.

* * * * *